(12) United States Patent
Webb et al.

(10) Patent No.: US 11,819,780 B2
(45) Date of Patent: Nov. 21, 2023

(54) CAPILLARY FITTING

(71) Applicant: ION OPTICKS RESEARCH PTY LTD, Middle Camberwell (AU)

(72) Inventors: Andrew Ian Webb, Camberwell (AU); Jarrod John Sandow, Brunswick West (AU)

(73) Assignee: Ion Opticks Research Pty Ltd., Parkville (AU)

( * ) Notice: Subject to any disclaimer, the term of this patent is extended or adjusted under 35 U.S.C. 154(b) by 267 days.

(21) Appl. No.: 16/958,911

(22) PCT Filed: Jan. 25, 2019

(86) PCT No.: PCT/AU2019/050061
§ 371 (c)(1),
(2) Date: Jun. 29, 2020

(87) PCT Pub. No.: WO2019/144199
PCT Pub. Date: Aug. 1, 2019

(65) Prior Publication Data
US 2020/0353379 A1    Nov. 12, 2020

(30) Foreign Application Priority Data

Jan. 29, 2018 (AU) .................... 2018900263
Nov. 29, 2018 (AU) .................... 2018904542

(51) Int. Cl.
*B01D 15/22* (2006.01)
*F16L 13/14* (2006.01)

(52) U.S. Cl.
CPC ............ *B01D 15/22* (2013.01); *F16L 13/142* (2013.01); *B01L 2300/0838* (2013.01)

(58) Field of Classification Search
CPC ....... F16L 13/142; F16L 13/14; F16L 13/143; G01N 30/02; G01N 30/60; G01N 30/00;
(Continued)

(56) References Cited

U.S. PATENT DOCUMENTS 5,492,376 A    2/1996    Usui et al.
6,817,554 B2    11/2004    Gangl et al.
(Continued)

FOREIGN PATENT DOCUMENTS

CN    106471303 A    3/2017
EP    1918705 B1    12/2009
(Continued)

OTHER PUBLICATIONS

International Search Report dated Apr. 8, 2019 for International Patent Application No. PCT/AU2019/050061.
(Continued)

*Primary Examiner* — Bradley R Spies
*Assistant Examiner* — Jeannie McDermott
(74) *Attorney, Agent, or Firm* — STERNE, KESSLER, GOLDSTEIN & FOX P.L.L.C.

(57) ABSTRACT

Fittings for capillaries, such as those in chromatographic systems, can be difficult to reliably assemble. The invention relates to a connector for providing a fluid connection between a capillary and a fluid conduit, said connector comprising: a capillary holder for receiving an end of the capillary, said capillary comprising inner capillary tubing, wherein the inner capillary tubing of the received end of the capillary is located within a compliant material sleeve; a deformable portion configured for deforming so that the compliant material of the sleeve in the capillary holder is deformed to create a seal between the inner capillary tubing and the connector; and a receiving portion configured to receive a fitting at an end of the fluid conduit; wherein the capillary holder and the receiving portion are connected so that the connector is configured to fluidly connect the capillary and the fluid conduit.

18 Claims, 18 Drawing Sheets

(58) Field of Classification Search
CPC .............. G01N 2030/027; B01D 15/22; B01L 2300/0838; B01L 2200/027
See application file for complete search history.

(56) References Cited

U.S. PATENT DOCUMENTS

| | | | |
|---|---|---|---|
| 7,959,810 B1 | 6/2011 | Dreux et al. | |
| 8,227,750 B1 | 7/2012 | Zhu et al. | |
| 8,237,116 B2 | 8/2012 | Correale | |
| 9,110,071 B2 | 8/2015 | Marto | |
| 9,302,415 B2 | 4/2016 | Theodorsen et al. | |
| 11,016,068 B2 | 5/2021 | Robson et al. | |
| 11,525,833 B2 | 12/2022 | Yan et al. | |
| 11,536,725 B2 | 12/2022 | Yan et al. | |
| 11,630,092 B2 | 4/2023 | Zhang | |
| 2012/0061955 A1* | 3/2012 | Hochgraeber | F16L 37/02 285/342 |
| 2013/0126021 A1 | 5/2013 | Hobbs | |
| 2014/0145437 A1 | 5/2014 | Bürger et al. | |
| 2014/0166562 A1 | 6/2014 | Michienzi | |
| 2015/0198567 A1* | 7/2015 | Buerger | B01D 15/125 285/347 |
| 2015/0198571 A1 | 7/2015 | Vorm | |
| 2017/0252746 A1 | 9/2017 | Bache et al. | |
| 2017/0356575 A1* | 12/2017 | Buerger | F16L 21/02 |
| 2018/0356376 A1* | 12/2018 | Leveille | F16L 9/14 |
| 2023/0030920 A1 | 2/2023 | Lindseth et al. | |
| 2023/0251266 A1 | 8/2023 | Yan et al. | |

FOREIGN PATENT DOCUMENTS

| | | |
|---|---|---|
| GB | 2090932 A | 7/1982 |
| WO | 2013032832 A1 | 3/2013 |

OTHER PUBLICATIONS

Search Information Statement (SIS) dated Apr. 8, 2019 for International Patent Application No. PCT/AU2019/050061.
EPO Communication pursuant to Article 94(3) EPC in counterpart European Patent Application No. 19743658.7, dated Feb. 22, 2023 (5 pages).
European Search Report in counterpart European Patent Application No. EP 19743658.7, dated Oct. 5, 2021 (7 pages).

* cited by examiner

CAPILLARY FITTING

TECHNICAL FIELD

The present invention relates to a fitting for providing a fluid connection between a capillary and a fluid conduit.

BACKGROUND

Chromatography is an analytical technique for separating components of a fluid mixture for subsequent analysis and/or identification. In chromatographic systems, liquids and gases are conveyed through connecting lines between components and instrument parts. Due to the high pressure applied in most high performance liquid chromatography (HPLC) and ultra-high performance liquid chromatography (UHPLC) systems, pressure sealing of the components in and along the fluid flow path is required.

In HPLC and UHPLC, a liquid has to be provided usually at a very controlled flow rate (e.g. in the range of nanoliters to milliliters per minute) and at high pressure (typically 20-100 MPa, 200-1000 bar, and beyond up to currently 200 MPa, 2000 bar) at which compressibility of the liquid becomes noticeable. For liquid separation in an HPLC or UHPLC system, a mobile phase comprising a sample fluid with compounds to be separated is driven through a stationary phase (such as a chromatographic column), thus separating different compounds of the sample fluid which may then be identified. The stationary phase material is typically a finely divided solid or gel, such as small particles with diameters of a few microns.

The mobile phase, for example a solvent, is pumped under high pressure typically through a column of stationary phase material, and the sample (e.g. a chemical or biological mixture) to be analysed is injected into the column. As the sample passes through the column with the liquid, the different compounds, each one having a different affinity for the packing medium, move through the column at different speeds. Those compounds having greater affinity for the stationary phase move more slowly through the column than those having less affinity, and this speed differential results in the compounds being separated from one another as they pass through the column.

The mobile phase with the separated compounds exits the column and passes through a detector, which identifies the molecules, for example by spectrophotometric absorbance or mass spectrometry measurements. A two-dimensional plot of the detector measurements against elution time or volume, known as a chromatogram, may be made, and from the chromatogram the compounds may be identified. For each compound, the chromatogram displays a separate curve or "peak". Effective separation of the compounds by the column is advantageous because it provides for measurements yielding well defined peaks having sharp maxima inflection points and narrow base widths, allowing good resolution and reliable identification of the mixture constituents.

It is desirable to minimise or avoid sources of band broadening, while maintaining pressure with a desired range. Broad peaks are undesirable as they may allow minor components of the mixture to be masked by major components and go unidentified. Thus, it is desirable to minimise or avoid, during a sample run, carry over (i.e. the sample is temporally trapped and released later). It is also desirable for the connection between components to be configured to reduce or eliminate any dead volume that may exist in between fluid conduits, including capillaries, because the dead volume can adversely impact the performance of a chromatographic system. Dead volumes can have significant effects on chromatographic peak broadening, which in some cases may result in errors in identifying, quantifying or purifying individual components of the mixture.

Fittings for capillary tubes can be difficult to reliably assemble such that they deliver the desired performance. In particular, the end of the capillary tube may be inadvertently damaged or crushed when attaching the fitting thereto. Thus, it is desirable to provide an alternative fitting that can be more reliably assembled, while still minimising carry over and dead volume.

Accordingly, it is desired to address the above or at least provide a useful alternative.

SUMMARY

The present invention provides a connector for providing a fluid connection between a capillary and a fluid conduit, said connector comprising:
 a capillary holder for receiving an end of the capillary, said capillary comprising inner capillary tubing, wherein the inner capillary tubing of the received end of the capillary is located within a compliant material sleeve;
 a deformable portion configured for deforming so that the compliant material of the sleeve in the capillary holder is deformed to create a seal between the inner capillary tubing and the connector; and
 a receiving portion configured to receive a fitting at an end of the fluid conduit; wherein the capillary holder and the receiving portion are connected so that the connector is configured to fluidly connect the capillary and the fluid conduit.

The connector of the present invention may be particularly useful for providing a fluid connection between a capillary and a fluid conduit in chromatographic systems, but is not limited to use in such systems. The connector of the presenting invention may be useful in other applications where it is desirable to connect capillaries to fluid conduits. The connector may be useful in connecting capillaries for gas and super-critical fluid chromatography.

In a first aspect, present invention provides a connector for providing a fluid connection between a capillary and a fluid conduit, said connector comprising:
 a capillary recess for receiving an end of the capillary, said capillary comprising inner capillary tubing within a compliant material sleeve;
 a deformable portion configured for deforming so that the compliant material of a capillary received in the capillary recess is deformed to create a seal between the inner capillary tubing and the connector;
 a receiving portion configured to receive a fitting at an end of the fluid conduit;
 a connecting passage connecting the capillary recess and the receiving portion and configured to fluidly connect the capillary and the fluid conduit.

The deformable portion of the connector of the present invention may comprise a crimpable portion configured for crimping so that the compliant material of a capillary received in the capillary recess is deformed to create a seal between the inner capillary tubing and the connector.

In some embodiments, the connecting passage is configured to receive the inner capillary tubing. The connecting passage may be configured to receive the inner capillary tubing and part of the compliant material sleeve. In some other embodiments, the connecting passage has a bore narrower than the inner capillary tubing.

In a second aspect, the connector may not require a connecting passage. In addition, in the second aspect, the connector may comprise the compliant material sleeve, rather than the capillary. In this second aspect, the capillary holder is configured to receive the compliant material sleeve so that, when the capillary holder receives the end of the capillary, the inner capillary tubing is also received by the compliant material sleeve. The deformable portion may comprise a crimpable portion configured for crimping so that the compliant material received in the capillary holder is deformed to create a seal between the inner capillary tubing and the connector.

In some embodiments of the second aspect, the capillary holder comprises a sleeve section configured for receiving and locating the compliant material sleeve.

Once the deformable portion of the connector has been deformed so as to form the seal between the inner capillary tubing and the connector, the connector is fixed to the end of the capillary, forming a capillary assembly. Thus, the present invention further provides a capillary assembly comprising:
  a connector according to the present invention; and
  a capillary comprising an inner capillary tubing;
  wherein: an end of the capillary is received in the capillary holder and located within a compliant material sleeve; and the deformable portion is deformed so that the compliant material is deformed to create a seal between the inner capillary tubing and the connector. For example, the first aspect of the present invention provides a capillary assembly comprising:
  a capillary comprising an inner capillary tubing within a compliant material sleeve; and
  a connector according to the present invention, wherein an end of the capillary is received in the capillary recess and the deformable portion is deformed so that the compliant material is deformed to create a seal between the inner capillary tubing and the connector.

Some embodiments of the capillary assembly comprise:
  a capillary comprising an inner capillary tubing within a compliant material sleeve; and
  a connector;
  wherein: the deformable portion of the connector is a crimpable portion configured for crimping; an end of the capillary is received in the capillary holder, such as the capillary recess; and the crimpable portion is crimped so that the compliant material is deformed to create a seal between the inner capillary tubing and the connector.

For embodiments using a connector in which the connecting passage is configured to receive the inner capillary tubing, there may be provided a capillary assembly, wherein an end portion of the inner capillary tubing is received in the connecting passage. In some embodiments of this capillary assembly, the connecting passage extends between an end face of the capillary recess and a connecting face of the receiving portion; and the inner capillary tubing received in the connecting passage extends therethrough until the connecting face.

In some embodiments, the connecting passage is configured to receive the inner capillary tubing and part of the compliant material sleeve and, in the capillary assembly, an end portion of the inner capillary tubing and part of the compliant material sleeve is received in the connecting passage. The part of the compliant material sleeve received in the connecting passage may have a reduced diameter relative to a second part of the compliant material sleeve located in the capillary recess. The inner capillary tubing received in the connecting passage may extend therethrough until the connecting face. The part of the compliant material sleeve received in the connecting passage may extend therethrough until the connecting face.

As noted above, the present invention may be particularly useful for providing a fluid connection between a capillary and a fluid conduit in chromatographic systems. In some embodiments of the capillary assembly, the capillary forms part of a chromatography column. In these embodiments, the inner capillary tubing may be packed with a stationary phase material that is typically a finely divided solid or gel, such as small particles with diameters of a few microns.

Also provided is a method of assembling a capillary assembly in accordance with the present invention, said method comprising:
  inserting an end of the capillary into the capillary holder; and
  deforming the deformable portion so that the compliant material is deformed to create a seal between the inner capillary tubing and the connector. A method of assembling a capillary assembly in accordance with the first aspect of the present invention is provided, said method comprising:
  inserting an end of the capillary into the capillary recess; and
  deforming the deformable portion so that the compliant material is deformed to create a seal between the inner capillary tubing and the connector.

For embodiments using a connector in which the deformable portion comprises a crimpable portion, deforming the deformable portion can comprise:
  crimping the crimpable portion so that the compliant material is deformed to create a seal between the inner capillary tubing and the connector.

For embodiments using a connector in which the connecting passage is configured to receive the inner capillary tubing, the method may comprise (before deforming the deformable portion): displacing the inner capillary tubing relative to the compliant material sleeve so that an end portion of the inner capillary tubing is inserted into the connecting passage. In some embodiments, the connecting passage extends between an end face of the capillary recess and a connecting face of the receiving portion, and the method comprises:
  inserting a dummy part into the receiving portion so that the dummy part abuts the connecting face and extends across the connecting passage; and
  displacing the inner capillary tubing relative to the compliant material sleeve so that the end portion of the inner capillary tubing is inserted into the connecting passage until the inner capillary tubing contacts the dummy part at the connecting face.

In embodiments of the first aspect where the connecting passage is configured to receive the inner capillary tubing and part of the compliant material sleeve, the method may comprise inserting the part of the compliant material sleeve into the connecting passage so that a second part of the compliant material sleeve abuts the end face of the capillary recess.

In embodiments where connector is in accordance with the second aspect, the method may comprise:
  inserting the compliant material sleeve into the capillary holder;
  inserting an end of the capillary into the capillary holder so that the inner capillary tubing is located within the compliant material sleeve; and deforming the deformable portion so that the compliant material is deformed to create a seal between the inner capillary tubing and the connector. In embodiments where the capillary holder comprises a sleeve section, inserting the compliant material sleeve into the capillary holder may comprise inserting the compliant material sleeve along a first direction so that it is located in the sleeve section; wherein the end of the capillary is inserted into the capillary holder along a second direction that is opposite to the first direction.

In some embodiments, said method comprises before deforming the deformable portion:

inserting the capillary into the capillary holder so that the inner capillary tubing is inserted in an end of the compliant material sleeve distal to the receiving portion and emerges out an end proximal to the receiving portion; and displacing the inner capillary tubing relative to the compliant material sleeve so the end of the inner capillary tubing is aligned with the end proximal to the receiving portion or located within the compliant material sleeve at a position near the end proximal to the receiving portion. The method may comprise inserting a dummy part into the receiving portion so that the dummy part displaces the inner capillary tubing until the dummy part abuts the compliant material sleeve.

BRIEF DESCRIPTION OF THE DRAWINGS

Various embodiments of the present invention are described, by way of example only, with reference to the following drawings.

DETAILED DESCRIPTION

Figure 1:
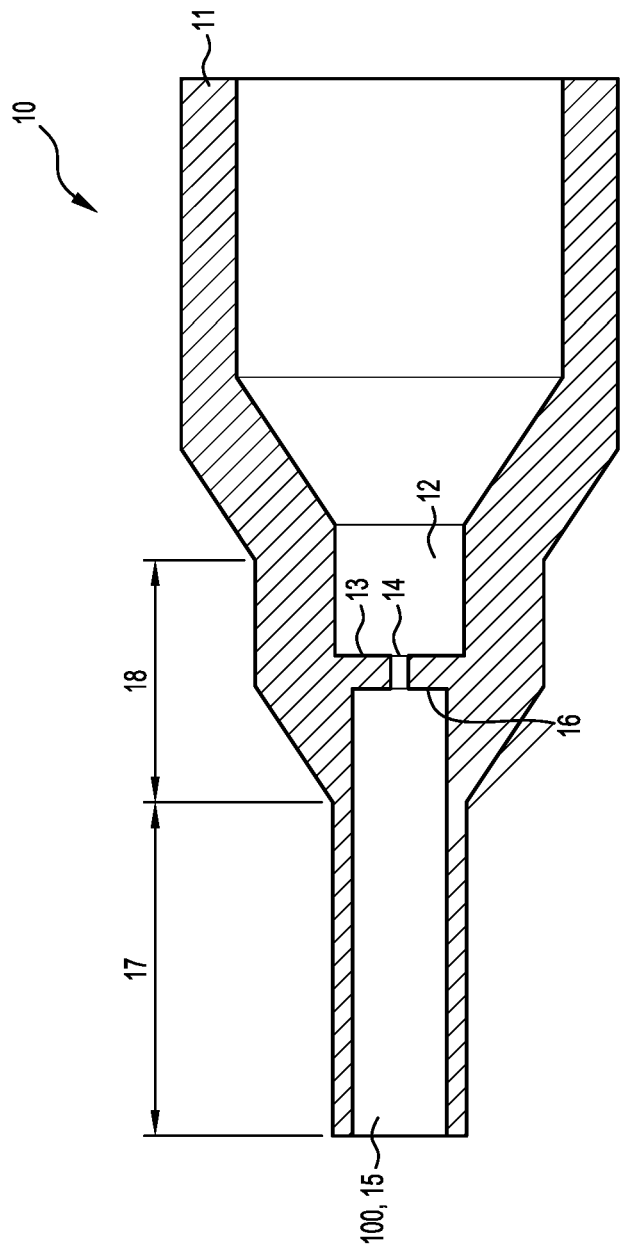
FIG. 1 is a schematic cross-section of an embodiment of a connector in accordance with the present invention.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

As used herein, the singular forms "a," "an," and "the" designate both the singular and the plural, unless expressly stated to designate the singular only.

The term "about" and the use of ranges in general, whether or not qualified by the term about, means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

In addition, where dimensions are described herein, it will be appreciated that plus or minus (±) typical manufacturing tolerances are applicable to those values. As appreciated by those in the art, manufacturing tolerances may be determined to achieve a desired mean and standard deviation of manufactured components in relation to the ideal component profile.

The present invention provides a connector for providing a fluid connection between a capillary and a fluid conduit, said connector comprising:

a capillary holder for receiving an end of the capillary, said capillary comprising inner capillary tubing, wherein the inner capillary tubing of the received end of the capillary is located within a compliant material sleeve;

a deformable portion configured for deforming so that the compliant material of the sleeve in the capillary holder is deformed to create a seal between the inner capillary tubing and the connector; and a receiving portion configured to receive a fitting at an end of the fluid conduit; wherein the capillary holder and the receiving portion are connected so that the connector is configured to fluidly connect the capillary and the fluid conduit.

By deforming the deformable portion of the connector to form the seal between the inner capillary tubing and the connector, the connector is fixed to the end of the capillary, thus forming a capillary assembly. In the capillary assembly of the present invention, there may be a connector at either or each end of the capillary.

In a first aspect, the present invention provides a connector for providing a fluid connection between a capillary and a fluid conduit, said connector comprising:

a capillary recess for receiving an end of the capillary, said capillary comprising inner capillary tubing within a compliant material sleeve;

a deformable portion configured for deforming so that the compliant material of a capillary received in the capillary recess is deformed to create a seal between the inner capillary tubing and the connector;

a receiving portion configured to receive a fitting at an end of the fluid conduit;

a connecting passage connecting the capillary recess and the receiving portion and configured to fluidly connect the capillary and the fluid conduit.

As noted above, in a second aspect, the connector may not require a connecting passage. In addition, in the second aspect, the connector may comprise the compliant material sleeve, rather than the capillary. The capillary holder can be configured to receive the compliant material sleeve so that when the capillary holder receives the end of the capillary, the inner capillary tubing is also received by the compliant material sleeve. In this aspect, the compliant material of the sleeve received in the capillary holder is deformed to create a seal between the inner capillary tubing and the connector.

The term "fluid" as used herein is intended to include liquids and gases, as well as a mixture thereof, including emulsions, dispersions and slurries of finely divided particulates suspended in a liquid. The nature of the fluid to be conveyed along the fluid conduit and the inner capillary tubing will depend upon the particular application in which the connector is to be utilised.

As used herein, "capillary" refers to a tube which has a fine internal diameter. In the present invention, the capillary comprises inner capillary tubing. In some embodiments, such as embodiments of the first aspect of the present invention, the capillary comprises inner capillary tubing within a compliant material sleeve. The connector of the present invention may be used with capillaries having inner capillary tubing with an external diameter of about 0.0001 to about 5 mm, with preferable external diameters of 0.25 to about 0.5 mm, such as about 0.35 to about 0.38 mm. The lumen of the inner capillary tubing (i.e. the bore of the tubing) may have a diameter of 0.01 to about 0.2 mm, such as about 0.025 to about 0.1 mm, for example about 75 μm.

The fluid conduit may be another capillary, which may comprise inner capillary tubing with or without a surrounding compliant material sleeve.

The inner capillary tubing may be ceramic glass, borosilicate glass, cladded fused silica, fused silica glasses, aluminosilicate glasses, glass-lined stainless steel, quartz, or metal such as stainless steel, titanium, nickel, gold, or platinum. For example, in some embodiments, the inner capillary tubing may be fused-silica, polyimide coated fused-silica, aluminium coated fused-silica or borosilicate glass.

When the inner capillary tubing includes a coating, such as when the inner capillary tubing is polyimide coated fused silica, the thickness of the coating may be about 0.001 mm to about 0.5 mm such as about 0.01 mm. The outer diameter of the coating may be about 0.1% to about 50% greater than the outer diameter of the underlying tubing of the inner capillary tubing, such as about 5%. Thus, in some embodiments, the capillary may comprise underlying tubing (such as fused silica), a coating on the underlying tubing (such as polyimide) and the compliant material sleeve.

The inner capillary tubing may be rigid or flexible. However, the compliant material sleeve will be relatively more compliant than the inner capillary tubing and the deformable portion of the connector of the present invention. In particular, deformable portion and the compliant material sleeve can be configured for the selected inner capillary tubing so that, when the deformable portion of the connector is deformed, the compliant material is deformed to create a seal between the inner capillary tubing and the connector, but the inner capillary tubing is not crushed or significantly deformed such that there is an unacceptable compromise of the fluid flow through the capillary. The deformation of the compliant material may be elastic and/or plastic deformation.

Deforming the deformable portion onto the inner capillary tubing in the absence of the compliant material sleeve may lead to an unacceptable compromise of the fluid flow through the capillary. For example, when the inner capillary tubing forms part of a chromatography column, the deformation required to form a high pressure seal may crush the inner capillary tubing. In the present invention, the intervening layer of compliant material, provide by the sleeve, distributes the load exerted by the deformed deformable portion so that a suitable seal can be formed. Thus, the compliant material can protect the inner capillary tubing so that the performance of the capillary is maintained at an appropriate level. While the thickness of the compliant material may be reduced in the region of the deformation of the deformable portion, a layer of compliant material remains between the inner capillary tubing and the part(s) of the deformable portion that have been deformed. Deforming the compliant material does not displace the compliant material from between the inner capillary tubing and the connector so that there is direct contact of the part(s) of the deformable portion that have been deformed with the inner capillary tubing. Thus, in the present invention, the deformable portion may be configured for deforming so that the compliant material of the sleeve in the capillary holder is deformed to create a seal of interposed compliant material between the inner capillary tubing and the connector.

The compliant material may comprise a polymer. The compliant material may comprise one or more of: polyethylene terephthalate; polyethylene, such as high density polyethylene (HDPE) or low density polyethylene (LDPE); polyvinyl chloride; polypropylene; and polystyrene. The compliant material may comprise a polymer selected from the group consisting of polyimides, fluoropolymers, polyaryletherketones (PAEK) and mixtures thereof. In some embodiments, the compliant material may comprise a polyaryletherketone, and the polyaryletherketone may be selected from the group consisting of polyetherketone (PEK), polyetheretherketone (PEEK) and polyetherketoneketone (PEKK). In some embodiments, it may be particularly preferred for the compliant material to comprise PEEK.

The connector may comprise a metal or alloy that is biocompatible and/or inert, or a metal or alloy that is coated with a biocompatible and/or inert material (that, e.g., may be a biocompatible and/or inert metal). Biocompatible and/or inert materials are discussed further below. The connector may comprise stainless steel, titanium, nickel, gold, or platinum. If the connector comprises a metal or alloy coated with a biocompatible and/or inert material, the coating can be such that the deformable portion can be deformed without exposing the underlying metal or alloy. That is, the deformation of the deformable portion may not damage the coating in such a way that its efficacy is substantially affected.

When used in chromatographic applications, at the junction of the inner capillary tubing and the fitting, the material is preferably conductive to allow the application of the electrospray voltage for ionisation whilst maintaining minimal dead volume. That is, the end of the inner capillary tubing may be surrounded by a conductive material and/or in fluid connection with a connecting passage made in a conductive material. In embodiments where the compliant material sleeve is around the end of the inner capillary tubing, the compliant material may be conductive. A conductive material, as used herein, refers to an electrically conductive material. The voltage connection is typically greater than 1 kV. Thus, the conductive material may be a material that is electrically conductive when subjected to a voltage of greater than 1 kV.

A suitable conductive compliant material may have an electrical conductivity of less the $10^7 \Omega$, or about less than $10^5 \Omega$. A suitable conductive compliant material may have a specific volume resistance of about $10^3$ $\Omega$cm to about $10^5$ $\Omega$cm (measured in accordance with DIN EN 61340-2-3, conductive rubber, 23° C., 12% r.h.). A suitable conductive compliant material may have a specific surface resistance of about $10^2 \Omega$ to about $10^4 \Omega$ (measured in accordance with DIN EN 61340-2-3, 20 mm thick sample, conductive rubber, 23° C., 12% r.h.). The conductive material may be a mixture of a suitable polymer, such as the polymers noted above, with carbon nanotubes. In some embodiments, the compliant material is conductive PEEK. For example, in some embodiments, the compliant material is TECAPEEK ELS nano black from Ensinger GmbH.

If the material at the junction of the inner capillary tubing and the fitting is not conductive, an electrically conductive connection may be provided upstream of the connector. For example, the electrically conductive connection may be upstream of the fitting received by the receiving portion. The electrically conductive connection may be at a junction with the fluid conduit connected to the fitting and one or more other fluid conduits. For example, the electrically conductive connection may be at a tee-junction with the fluid conduit connected to the fitting. The electrically conductive connection may be a specific connection provided along the fluid conduit. In some embodiments, the electrically conductive connection may be provided at the opposite end of the fluid conduit to the fitting or upstream of the fluid conduit, such as at the chromatography device.

The connector of the present invention may be manufactured as a unitary part. Typically, the connector of the first aspect of present invention is manufactured as a unitary part. As the connector of the present invention can be a unitary part, it may have a simpler construction than other fittings for connecting capillaries to fluid conduits and, as such, may be produced more economically. Accordingly, in some embodiments, the connector of the present invention may be advantageously used for disposable/single-use components. In particular, the capillary assembly of the present invention may be a disposable or single-use component.

In some embodiments, such as those of the second aspect, the connector may comprise the compliant material sleeve, rather than the capillary. In such embodiments, the compliant material sleeve is provided as a separate part of the connector. Preferably the remainder of the connector is manufactured as a unitary part.

In some embodiments, it is desirable that the connector (as well as other components, such as the capillary) is made of a biocompatible and/or inert material. In some embodiments, the material may be "bioinert". That is, the selected material may combine biocompatibility with biological or biochemical substances and inertness against aggressive chemical environment such as extreme pH values. Biocompatibility may be denoted as the capability to exist in harmony with biological material such as macro-molecules like proteins or genes. It may also denote the quality of not having toxic effects on biological systems. An inert material is ideally inert against extreme pH-values such as pH-values in the entire range of 1 to 14. That is, even in the presence of a strongly ionizing chemical environment, an inert material may not deteriorate, or at least not substantially be deteriorated. Thus, an inert material preferable does not generate a meaningful amount of ions. A meaningful amount of ions is an amount that may harm or negatively affect, for example, monoclonal antibodies, proteins, etc., or components of a chromatography system such as chromatographic columns or mass spectroscopy equipment.

It can be desirable for the material around the end of the inner capillary tubing to be the compliant material, as compliant materials may be more bioinert than the material selected for the connector.

When the end of the capillary is received in the capillary holder of the connector, the compliant material sleeve may be located such that the sleeve fills the capillary holder so that it contacts the internal surface(s) of the holder. In some embodiments, the capillary holder is a cylindrical bore in one end of the connector that extends to the receiving portion of the connector. The capillary holder may comprise a sleeve section configured for receiving and locating the compliant material sleeve. The sleeve section may be a section having a larger diameter than the remainder of the capillary holder.

The compliant material sleeve may be inserted into the sleeve section via the receiving portion. Once the sleeve is located in the sleeve section, the sleeve may provide an end face to the first part of the capillary holder and a compliant connecting face at the end of the receiving portion. Thus, the compliant material sleeve will be configured such that, when located in the sleeve section and after the deformable portion is deformed, a fitting received by the receiving portion will contact the compliant connecting face so that there is a good fluid connection between the fluid conduit and the passage going through the sleeve.

If the compliant material sleeve does not contact all walls of the capillary holder, or the sleeve section of the holder, when it is received into the recess, it is preferable that, after the deforming of the deformable portion, the compliant material is deformed so that the capillary fills the holder or the sleeve section to form a good seal.

Accordingly, it can be desirable for the external dimensions of the compliant material sleeve to closely match the internal dimensions of the capillary holder before the deformable portion is deformed. It may be preferred that the there is minimal clearance between the compliant material sleeve and the capillary holder, or at least the sleeve section of the holder, so that the sleeve can be received by the holder without damaging the compliant material or the inner capillary tubing. In such embodiments, the clearance between the compliant material sleeve and the wall(s) of the capillary holder extending in the longitudinal direction of the sleeve may be about 0.001 mm to about 0.5 mm, such as about 0.01 mm to about 0.05 mm. In some embodiments, the capillary holder may be sized so that the capillary may still be readily received, but where it is slightly force-fit so there is some deformation of the compliant material sleeve during insertion.

Typically, in the first aspect of the invention, when the end of the capillary is received in the capillary recess of the connector, the capillary substantially fills the recess so that it contacts internal surfaces of the recess. If the capillary does not contact all walls of the capillary recess when it is received into the recess, it is preferable that, after the deforming of the deformable portion, the compliant material is deformed so that the capillary fills the recess to form a good seal. Furthermore, the deformation of the compliant material by the deforming of the deformable portion may be such that the compliant material is urged against the end face of the capillary recess so as to further enhance the sealing around the inner capillary tubing at the interface with (or in the region of) the connecting passage. It is particularly desirable that there is good contact around the interface of the capillary recess and the connecting passage to minimise the risk of any dead volume being produced.

Accordingly, it can be desirable for the external dimensions of the compliant material sleeve to closely match the internal dimensions of the capillary recess before the deformable portion is deformed. It may be preferred that the there is minimal clearance between the capillary and the capillary recess so that the capillary can be received by the recess without damaging the compliant material or inner capillary tubing. In such embodiments, the clearance between the compliant material sleeve and the wall(s) of the capillary recess extending in the longitudinal direction of the capillary may be about 0.001 mm to about 0.5 mm, such as about 0.01 mm to about 0.05 mm. In some embodiments, the capillary recess may be sized so that the capillary may still be readily received by the recess, but where it is slightly force-fit so there is some deformation of the compliant material sleeve during insertion. In such embodiments, the end of the capillary may be received in the capillary recess of the connector so that it fills and contacts all internal surfaces of the recess.

The compliant material sleeve may be separate from the inner capillary tubing, such as a sheath, or a coating applied to the inner capillary tubing. The thickness of the compliant material sleeve may be about 0.1 mm to about 5 mm, such as about 0.58 mm. The outer diameter of the compliant material sleeve may about 50% to about 1000% greater than the outer diameter of the inner capillary tubing, such as about 400% to about 500%, for example about 433%.

The compliant material sleeve should be of a sufficient length that it can be deformed by the deformation of the deformable portion to create a seal between the inner capillary tubing and the connector. In some embodiments, the compliant material sleeve extends along the entire length of the capillary or substantially the entire length. Alternatively, the compliant material sleeve may extend along only part of the capillary. The compliant material sleeve may extend along the entire length of the capsule holder or along only part of the length. In the first aspect of the present invention, the compliant material sleeve will often extend along the capillary for at least the length that is received in the capillary recess. However, in some embodiments, the compliant material sleeve is shorter than the capillary recess. In such embodiments, the compliant material sleeve will, ideally, be located within the capillary recess so that it abuts the end face of the capillary recess, or is close to the end face, so as to minimise any dead volume.

In some embodiments, before the deformable portion has been deformed, it is desirable that the inner capillary tubing be capable of being displaced along the compliant material sleeve so that it can be caused to extend beyond the end of the compliant material sleeve. In particular, in the first aspect, the connecting passage may be configured to receive the inner capillary tubing. That is, the end of the inner capillary tubing can be inserted into the connecting passage before the deformable portion is deformed to create the seal. Typically, the connecting passage will be configured to permit the end portion of the inner capillary tubing to be received within the connecting passage with the minimum tolerance so as to minimise any potential dead volume around the inner capillary tubing.

Thus, in some embodiments of the capillary assembly, part of the inner capillary tubing extends into the connecting passage of the connector. In some of those embodiments, the inner capillary tubing extends to an intermediate point along the connecting passage. In some other embodiments, the inner capillary tubing extends along full length of the connecting passage. In some embodiments, the connecting passage extends between an end face of the capillary recess and a connecting face of the receiving portion; and the inner capillary tubing received in the connecting passage extends therethrough until the connecting face. It will be appreciated that the end face of the capillary recess is the face into which one end of the connecting passage is formed. Similarly, the connecting face of the receiving portion is the face into which the other end of the connecting passage is formed.

For such embodiments, it can be desirable for the dimensions of the connecting passage to closely match the inner capillary tubing so as to minimise or eliminate any dead volume in the region between the connecting passage and inner capillary tubing. In addition, the dimensions of the connecting passage will be selected so that the desired inner capillary tubing can be inserted into the connecting passage without damaging the tubing.

In some embodiments, the connecting passage may be configured to receive the inner capillary tubing and part of the compliant material sleeve. The connecting passage and the part of the compliant material sleeve to be received may be mutually configured so that a good seal is formed by the compliant material between the wall(s) of the connecting passage and the inner capillary tubing so as to minimise any dead volume. The received part of the compliant material sleeve may extend through the connecting passage to the same point as the inner capillary tubing. Alternatively, the received part of the sleeve and the inner capillary tubing may terminate at different points through the connecting passage. Typically, to minimise the dead volume, if the received part and the capillary terminate at different points, the received part will extend further into the connecting passage than the inner capillary tube.

In some embodiments, the compliant material sleeve extends slightly beyond the connecting face so as to form a compliant connecting face that can facilitate a good seal being formed with the fitting.

Alternatively, the connecting passage may have a bore narrower than the inner capillary tubing. The inner capillary tube will ideally abut the end face of the capillary recess so as to minimise any dead volume. In addition, it is preferable for the volume of the connecting passage to be low as possible to minimise the dead volume produced by it. It will be appreciated that the length and/or diameter of the connecting passage can be selected so at to minimise its volume. The connecting passage may have a length of about 0.1 mm to about 5 mm, such as about 1 mm. The bore (i.e. diameter) of the connecting passage may be about 0.01 mm to about 0.4 mm, such as about 0.025 mm. The connecting passage may have the minimum diameter that does not present an unacceptable risk of being clogged during use.

A connecting passage with a desirably fine bore may be manufactured by laser drilling.

The internal diameter of the fluid conduit may be smaller than the connecting passage. Alternatively, the connecting passage may be narrower than the fluid conduit.

In some embodiments, the connector is configured so that the ends of the capillary and fluid conduit engaged by the connector are arranged so that they are co-axial. If the capillary and fluid conduit are offset from each other, the offset should be such that the performance of the connector and the fluid communication between the capillary and fluid conduit are not unacceptably adversely affected.

In some embodiments, the connector is configured so that the connecting passage and the ends of the capillary and fluid conduit engaged by the connector are arranged so that they are co-axial. However, in some embodiments, it may be acceptable for the axis of one or more of the connecting passage and the ends of the capillary and fluid conduit engaged by the connector to be offset from one or both of the other axes. As noted above, the offset should be such that the performance of the connector and the fluid communication between the capillary and fluid conduit are not unacceptably adversely affected.

As noted above, the deformable portion is configured for deforming so that the compliant material of the sleeve received in the capillary holder is deformed to create a seal between the inner capillary tubing and the connector. The deformable portion can deform such that the size and/or shape of the capillary holder is changed. By altering the size and/or shape of the capillary holder, the compliant material sleeve may be deformed such that it is urged against wall(s) of the holder and pressed onto the inner capillary tubing so that a seal between the inner capillary tubing and the connector is formed. It is particularly desirable for there to be a good seal at the end of the inner capillary tubing so as to minimise the risk of producing a dead volume.

The seal that is formed may be able to withstand high fluid pressures, such as those typically encountered in chromatographic applications. The seal may be able to withstand pressures of at least 50 MPa, such as at least 100 MPa. The seal may be able to withstand pressures of up to about about 345 MPa (about 50,000 psi), such as about 138 MPa (about 20,000 psi). Furthermore, the seal may be able to withstand repeated cycles, such as up to 1000 cycles, or up to 10,000 cycles, of pressures of up to about 138 MPa (about 20,000 psi), such as pressures up to about 117 MPa (about 17,000 psi).

In the first aspect of the present invention, the deformable portion of the connector of the present invention is configured for deforming so that the compliant material of a capillary received in the capillary recess is deformed to create a seal between the inner capillary tubing and the connector. The deformable portion can deform such that the size and/or shape of the capillary recess is changed. By altering the size and/or shape of the capillary recess, the compliant material sleeve may be deformed such that it is urged against faces of the capillary recess, in particular the end face and the region near the end face, and pressed onto the inner capillary tubing, so that a seal between the inner capillary tubing and the connector is formed. As a result of the deformation, the compliant material may be urged against the end face of the capillary recess so as to further enhance the sealing around the inner capillary tubing at the interface with (or in the region of) the connecting passage. To minimise the risk of any dead volume being produced, it is particularly desirable that there is good contact around the interface of the capillary recess and the connecting passage.

Typically, deformation of the deformable portion reduces the volume of the capillary holder, such as the capillary recess. Accordingly, in some embodiments, the deformable portion is a compressible portion configured for compressing so that the compliant material received in the capillary holder is deformed to create a seal between the inner capillary tubing and the connector. In some embodiments, the deformable portion is a crimpable portion configured for crimping so that the compliant material received in the capillary holder is deformed to create a seal between the inner capillary tubing and the connector. In some embodiments of the first aspect, the deformable portion is a crimpable portion configured for crimping so that the compliant material of a capillary received in the capillary recess is deformed to create a seal between the inner capillary tubing and the connector. The radial compression effected by the crimping can compress the connector onto the compliant material sleeve so that it is deformed such that it is urged against the faces of the capillary recess and compressed onto the inner capillary tubing, and a seal between the inner capillary tubing and the connector is formed.

The deformable portion may extend along part of the length, or along the full length, of the capillary holder, e.g. the capillary recess. In some embodiments, the capillary holder, e.g. the capillary recess, extends along the full length of the deformable portion and into an intermediate region of the connector.

It may not be necessary to deform the entire deformable portion so as to create a seal. Instead, only part of the deformable portion may need to be deformed so as to form an effective seal. For example, the deformable portion may only require deforming along about 0.5 mm to about 10 mm, for example about 2 mm to about 3 mm, such as about 3 mm, of the length of the deformable portion in order to form an effective seal. The deformable portion may only require deforming along about 6% to about 90%, such as about 40% of the length of the deformable portion in order to form an effective seal. In some embodiments, the length of the deformable portion may be less than about 5 mm, such as less than about 4 mm, for example, about 2 to about 3 mm.

In embodiments where the deformable portion is a crimpable portion, the crimpable portion may only require crimping along about 0.5 mm to about 10 mm, for example about 2 mm to about 3 mm, such as about 3 mm, of the length of the crimpable portion in order to form an effective seal. In some embodiments, the length of the crimpable portion may be less than about 5 mm, such as less than about 4 mm, for example, about 2 mm to about 3 mm.

The wall thickness of the deformable portion may be about 0.1 mm to about 5 mm, such as about 0.5 mm to about 0.7 mm. In some embodiments, the outer diameter of the deformable portion is about 1 to about 100%, such as about 31% greater than the outer diameter of the compliant material sleeve or the diameter of the capillary holder. Thus, in some embodiments of the first aspect, the outer diameter of the deformable portion is about 1 to about 100%, such as about 31%, greater than the outer diameter of the compliant material sleeve of the capillary or the diameter of the capillary recess. As noted above, it is desirable for the external dimensions of the compliant material sleeve to closely match the internal dimensions of the capillary holder, such as the capillary recess.

Deforming, such as crimping, may reduce the outer diameter of the deformed region of the deformable portion by about 2% to about 25%, such as about 7% to about 15%, for example about 9% to about 10%.

After deforming, the seal may be such that the capillary cannot be pulled out of the connector even when loads of up to 20 kg are applied. In some embodiments, the seal may be such that the inner capillary tubing will break before the capillary is pulled out of the connector.

Embodiments of the capillary assembly of the present invention may be able to withstand pressures of up to about about 345 MPa (about 50,000 psi), such as about 138 MPa (about 20,000 psi). Furthermore, embodiments of the capillary assembly of the present invention may be able to withstand repeated cycles, such as up to 1000 cycles, or up to 10,000 cycles, of pressures of up to about 138 MPa (about 20,000 psi), such as pressures up to about 117 MPa (about 17,000 psi). Embodiments of the capillary assembly may be able to withstand pressures of at least 50 MPa, such as at least 100 MPa.

In some embodiments, the seal may be such that there will be no leakage at pressures encountered during typical use of the capillary. For example, in embodiments where the capillary forms part of a chromatographic system, the capillary assembly of the present invention may be able to withstand pressures of up to about 138 MPa (about 20,000 psi), such as pressures up to about 117 MPa (about 17,000 psi), without leakage. As noted above, in some embodiments, the capillary may form part of a chromatography column. In some embodiments, the maximum operating pressure for the chromatography columns may be up to about 138 MPa (about 20,000 psi), such as pressures up to about 120 MPa, e.g about 117 MPa (about 17,000 psi).

The receiving portion of the connector is ideally configured so that there is a sealed engagement between the fitting and the connector. This sealed engagement should enable the effective fluid connection of the capillary and the fluid conduit. In addition, it is desirable for that sealed engagement to be such that any dead volume between the fluid conduit and the capillary is minimised or prevented.

The sealed engagement may be such that the fitting received in the receiving portion of may be able to withstand pressures of up to about 138 MPa (about 20,000 psi), such as pressures up to about 120 MPa, e.g. about 117 MPa (about 17,000 psi), within the fluid conduit, without significant leakage. Furthermore, some embodiments may be able to withstand repeated cycles, such as up to 1000 cycles, or up to 10,000 cycles, of pressures of up to about 138 MPa (about 20,000 psi), such as pressures up to about 117 MPa (about 17,000 psi).

The sealed engagement may be such that there will be no leakage at pressures encountered during typical use of the fitting and fluid conduit. For example, in embodiments where the fitting and fluid conduit forms part of a chromatographic system, the sealed engagement between the fitting and the connector of the present invention may be able to withstand pressures of up to about 138 MPa (about 20,000 psi), such as pressures up to about 120 MPa, e.g. about 117 MPa (about 17,000 psi), without leakage.

The receiving portion can be configured to receive a variety of fittings for fluid conduits that are known in the art, particularly those known in the art of fittings for fluid conduits of chromatography systems. The shape and configuration of the receiving part will typically be selected to optimise the engagement between the connector and the fitting. Thus, the receiving portion can be considered to be a female recess configured for the complementary male fitting. In some embodiments, the fluid conduit is another capillary and the fitting may be a commercially available fitting for a capillary.

Embodiments of the present invention are particularly suited to receiving fittings with a sealing element at the tip. For example, the fitting may be a commercially available fitting for a capillary, such as a Thermo Scientific™ Viper™ or nanoViper™ fitting, or an IDEX Health & Science Marvel X™ or Marvel Xact™ fitting. The fitting and fluid conduit may be a connector unit for connecting capillaries such as that described in US Patent Publication No. 2014/0145437, the contents of which are incorporated herein by reference.

In embodiments where the connector is configured for receiving a fitting with a sealing element at the tip of the fitting, the receiving portion may be configured so that at least part of the sealing element contacts a compliant connecting face formed by the compliant material sleeve to form a seal around passage in which the end of the inner capillary tubing is located. In embodiments of the first aspect, where the connector is configured for receiving a fitting with a sealing element at the tip of the fitting, the receiving portion may be configured so that at least part of the sealing element contacts the connecting face to form a seal around the connecting passage. In some embodiments, the sealing element is an annular sealing element provided on the outer side of the fluid conduit. In some embodiments, the sealing element may include a section which projects out of the capillary at the face of the end of the capillary.

The receiving portion may comprise a sealing recess into which the tip of the fitting may be inserted. In some embodiments, the receiving portion is such that the sealing element may be inserted together with the end of the fluid conduit into the sealing recess and an axial force can be exerted thereon such that, as a result of plastic or elastic deformation of the sealing element, sealing of the fitting is attained in the region of the connecting face, whereby the formation of a dead volume is minimised of prevented. During the dismounting of the fitting, the sealing element may also be pulled out of the sealing recess in a relatively simple manner together with the capillary.

In some embodiments, the connecting face of the sealing recess is formed by inserting the compliant material sleeve into the capillary holder. Thus, the connecting face of the sealing recess is a compliant connecting face. The receiving portion may be such that the fitting, optionally including a sealing element, may be inserted into the sealing recess and an axial force can be exerted thereon such that, as a result of plastic or elastic deformation of the compliant connecting face, sealing of the fitting is attained around the passage in which the inner capillary tubing is located, whereby the formation of a dead volume is minimised of prevented.

In some embodiments, the tip of the fitting fills the volume of the sealing recess as completely as possible, so as to minimise or avoid the formation of a dead volume. The fitting may be received by the receiving portion so as to press the sealing element against the surface of the receiving portion so that the sealing element deforms against the connecting face and/or the wall(s) of the sealing recess at the periphery of the connecting face.

The receiving portion can comprise engagement components that are complementary to the engagement components of the fitting. The complementary engagement components can be used to receiving the fitting in the receiving portion and retain it so that so that there is a sealed engagement between the fitting and the connector. As noted above, this sealed engagement should enable the effective fluid connection of the capillary and the fluid conduit. In some embodiments, the engagement component may be an internal threaded section. That is, the receiving portion often comprises an internal threaded section configured to engage a complementary external threaded section of the fitting. In such embodiments, the fitting may be screwed into the receiving portion. In embodiments where the fitting has a sealing element at the tip, the fitting may be screwed into the receiving portion until the sealing element contacts and deforms against the surface of the receiving portion so that there is a sealed engagement. In embodiments where receiving portion has a compliant connecting face, the fitting may be screwed into the receiving portion until the tip contacts and deforms against and/or deforms the compliant material of the receiving portion so that there is a sealed engagement.

The receiving portion of the connector may comprise alternative or additional engagement components to a complementary threaded section so that the desired fitting can be used.

As noted above, the connector and capillary assembly of the present invention may be used in chromatographic systems. In some embodiments, the capillary forms part of a chromatography column. Various configurations of chromatography columns utilising a capillary will be known to those skilled in the art. It will be apparent to those skilled in the art, in view of the present disclosure, that a variety of column configurations can be used with the connector and capillary assembly of the present invention.

The chromatography column may be an ion-exchange, normal phase or reverse phase chromatography column. The stationary phase of the column may be surface modified silica beads, or coated polymeric beads. The stationary phase of the column may include octadecyl carbon chain (C18)-bonded silica (USP classification L1), C8-bonded silica (USP classification L7), pure silica (USP classification L3), cyano-bonded silica (USP classification L10) and phenyl-bonded silica (USP classification L11). The stationary phase may have a particle size of 1.3-5 µm, for example 1.6 µm. The column may have a pore size of 80-400 Å, for example 120 Å.

The chromatography column may be capable of operating at temperatures of up to 65° C. (low pH). In some embodiments, the chromatography column may have pH stability for pH-values in the range of 1 to 8.

The chromatography column may be about 150 to about 750 mm long, for example about 250 mm long.

In some embodiments of the capillary assembly, the capillary forms part of a chromatography column comprising an integrated electrospray emitter. Electrospray ionization is a technique used in mass spectrometry to produce ions using an electrospray in which a high voltage is applied to a liquid to create highly-charged droplets that, under evaporation, create ions representative of the species contained in a sample solution.

Capillary columns may be prepared either completely packed throughout its length with a stationary phase or with the stationary phase material occupying only part of the capillary, typically in the vicinity of its tip. In the case of the latter, the capillary column is often fitted with a frit. The term 'frit' as used herein refers to a matrix material which may be a solid, or a porous, or microporous material used to retain stationary phase material within a separation column for performing pressure-driven liquid chromatography.

The choice and volume of the stationary phase material can vary depending on the complexity and volume of the sample, and the goal of the separation.

There are different approaches for packing fritted capillary columns. One such method is referred to as the dry packing method. In accordance with this method, dry packing material, such as glass, silica, polymeric powder or metallic powder, is forced into one end of capillary column. The particulate materials are rapidly vibrated as they are loaded into the tube through a funnel. A second method is the slurry packing method where a liquid comprising suspended particles of packing material, is forced under pressure into the proximal end of the tube, and pumped until the slurry reaches the frit at the distal end of the tube. The frit serves to filter the particulate packing material from the liquid, which is also known as the mobile phase. The mobile phase thus passes through the frit and out of the tube, while the solid packing particles remain behind the frit. Slurry packing normally requires the use of high pressures (>6.9 MPa, >1000 psi) in order to generate a high flow rate of mobile phase and resultant high impact velocity of the incoming particles. This high velocity forms a tightly packed bed.

In some embodiments, the capillary may be packed before the connector of the present invention is fixed (by deformation of the deformable portion) onto the end of the capillary. In some other embodiments, the connector may be fixed on to the end of the capillary before packing the column and the connector can be used to facilitate the packing process.

Figure 2:
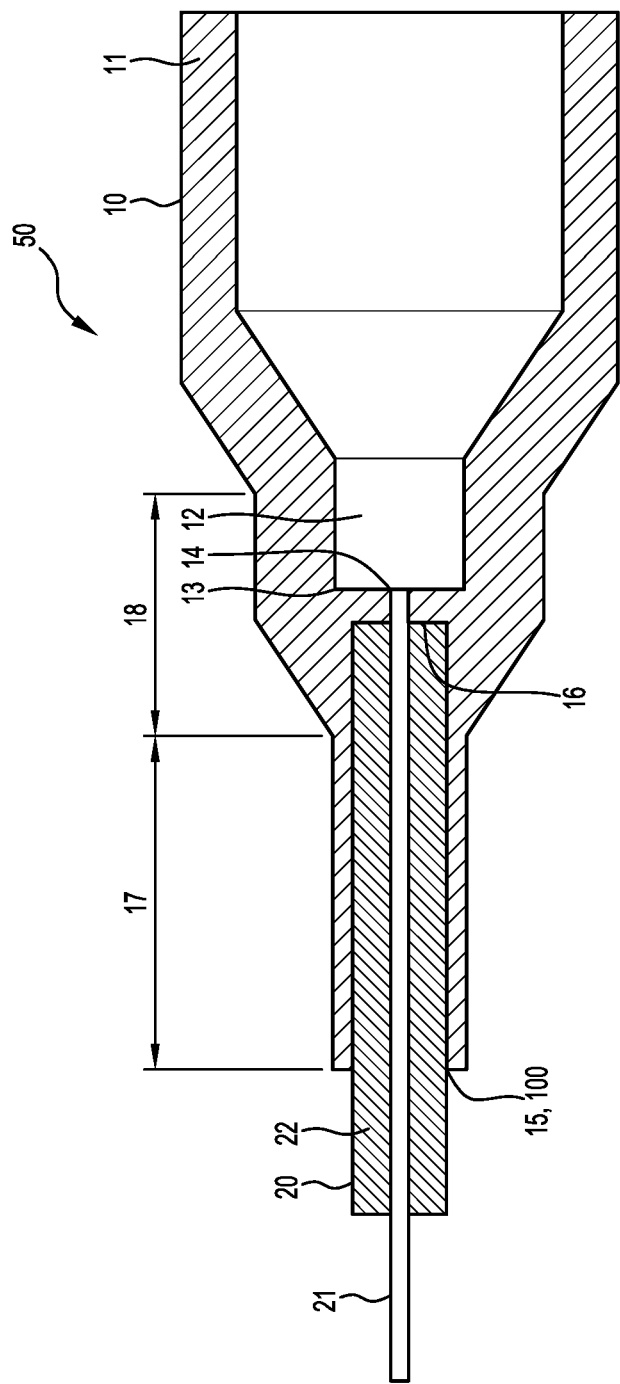
FIG. 2 is a schematic cross-section of the connector illustrated in FIG. 1, with the capillary in situ.

FIG. 1 is a schematic cross-section of an embodiment of a connector 10 in accordance with the present invention, and FIG. 2 is a schematic cross-section of this embodiment of the connector 10 with the capillary 20 in situ. Thus, FIG. 2 illustrates a capillary assembly 50 in accordance with the present invention. In FIG. 2, the inner capillary tubing 21 of the capillary 20 is not shown in cross-section. The illustrated embodiment of the connector 10 is one suitable for use in chromatographic systems.

The connector 10 includes a receiving portion 11 that is configured to receive a fitting at an end of a separate fluid conduit (not shown). In this schematic representation of the connector 10, engagement components on the receiving portion 11 (for receiving the fitting in the receiving portion and retaining it there) have been omitted. The size, shape and configuration of the receiving portion 11, in particular the inner dimensions of the receiving portion 11, will be determined by the size, shape and configuration of the fitting of the fluid conduit.

The embodiment shown in FIG. 1 is an embodiment of the connector 10 that is configured for use with a fitting having a tip with a sealing element on the end, such as a Thermo Scientific™ Viper™ or nanoViper™ fitting or the connector unit described in US Patent Publication No. 2014/0145437. Thus, the receiving portion 11 defines a sealing recess 12 into which the tip of the fitting can be inserted such that it abuts the connecting face 13 so that there is a suitable seal between the connector 10 and the fluid conduit. The connecting face 13 is an annular face surrounding one end of the connecting passage 14. Typically, the receiving portion 11 is configured such that the fluid conduit is located so that it is co-axial with the connecting passage 14 and the capillary holder 100 (which in this embodiment is a capillary recess 15) so that, when the capillary 20 (shown in FIG. 2) is received in the capillary recess 15, the inner capillary tubing 21 is aligned with the connecting passage 14 and the fluid conduit. The sealing recess 12 and the capillary recess 15 both extend into the intermediate region 18 of the connector 10.

FIG. 2 shows the capillary 20 including the compliant material sleeve 22 and the inner capillary tubing 21 received by the capillary recess 15. The capillary 20 may be provided with the compliant material sleeve 22 such that the sleeve 22 extends at least along the length of the capillary recess 15. For example, the sleeve 22 may be provided along substantially the entire length of the inner capillary tubing 21. However, to minimise or substantially eliminate any dead volume between the fitting of the fluid conduit (not shown) and the inner capillary tubing 21, the inner capillary tubing 21 extends at least part-way and preferably along the entire length (as shown in FIG. 2) of the connecting passage 14. The compliant material sleeve 22 is arranged so that it abuts the end face 16 of the capillary recess 15. The end face 16 is an annular face surrounding the end of the connecting passage 14 that interfaces with the capillary recess 15.

The connector 10 includes a deformable portion 17. In this illustrated embodiment, the deformable portion 17 is a crimpable portion 17, and it will be denoted as such in the following description. The crimpable portion 17 is a crimpable sleeve that surrounds the capillary 20. The wall thickness of the crimpable portion 17 and the dimensions of the capillary recess 15 will be selected so that the capillary recess 15 may accommodate the capillary 20 when the crimpable portion 17 is uncrimped, but that when the crimpable portion 17 is crimped the compliant material sleeve 22 deforms so that a seal is formed between the inner capillary tubing 21 and the connector 10 by the compliant material sleeve 22.

It may not be necessary to crimp the entire crimpable portion 17 so as to create a seal. Instead, only part of the crimpable portion 17 may need to be crimped so as to form an effective seal. For example, the crimpable portion 17 may only require crimping along a length of 2 to 3 mm in order to form an effective seal. The deformation of the compliant material by the crimping of the crimpable portion 17 may be such that the compliant material is urged against the end face 16 of the capillary recess 15 so as to further enhance the sealing around the inner capillary tubing 21.

Figure 3A:
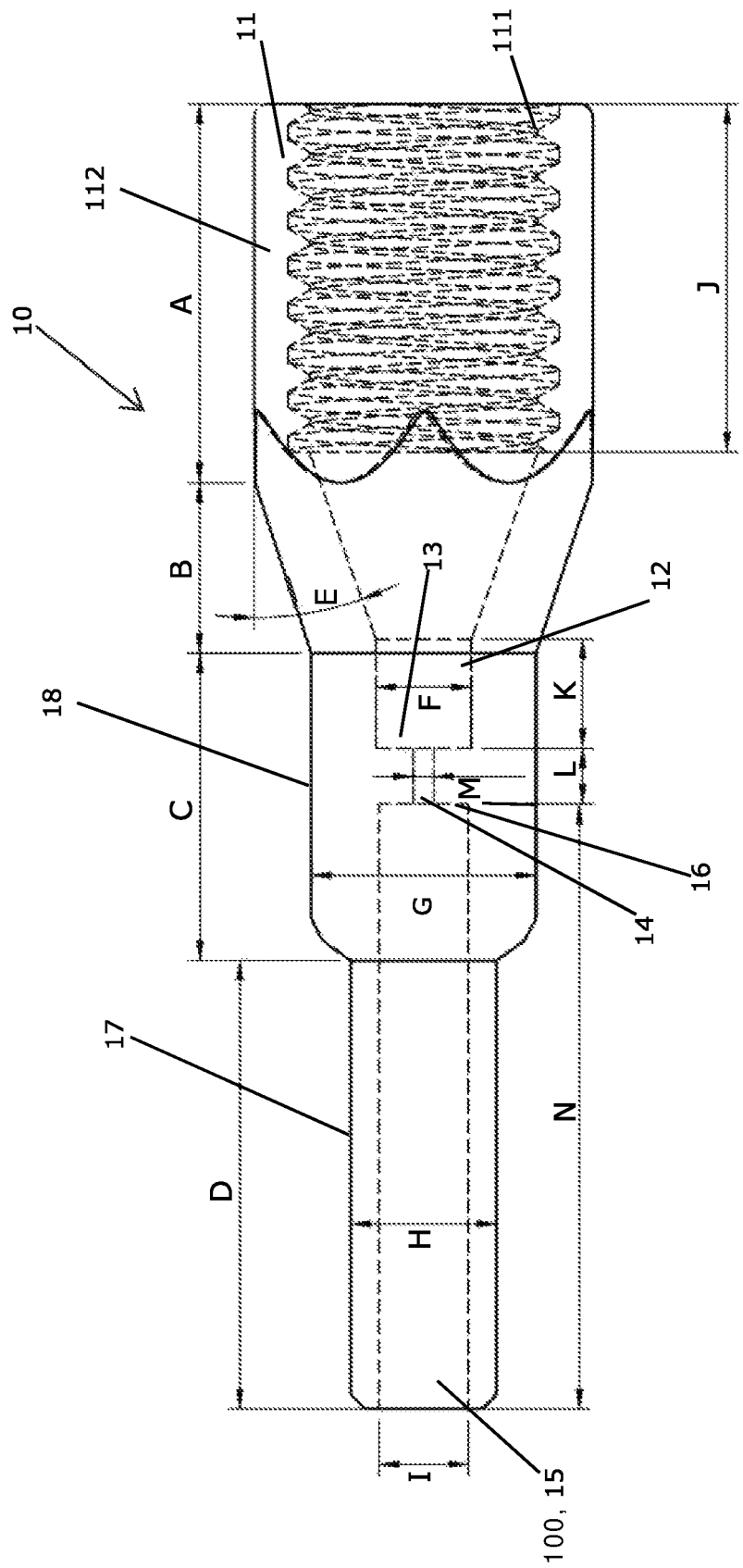
FIGS. 3a and 3b show side and end views of another embodiment of the connector in accordance with the present invention.
Figure 3B:
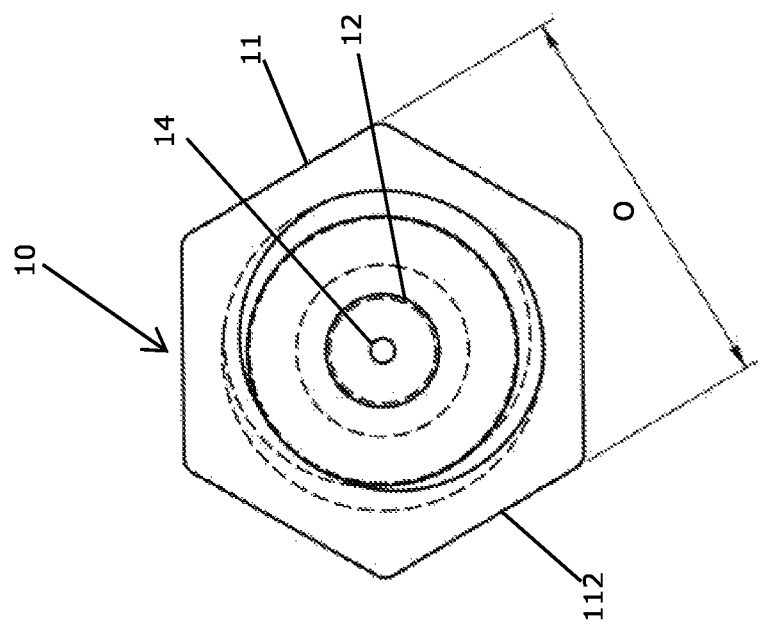

FIGS. 3*a* and 3*b* show side and end views of an embodiment of the connector 10 in accordance with the present invention. The connector 10 is configured for use with a fitting having a tip with a sealing element on the end, such as a Thermo Scientific™ Viper™ or nanoViper™ fitting or the connector unit described in US Patent Publication No. 2014/0145437. In FIGS. 3*a* and 3*b*, hidden features are shown in broken lines.

The overall length of the connector 10 may be about 5 mm to about 100 mm, for example, about 15 mm to about 50 mm, for example about 23.3 mm. Dimension A of the receiving portion 11 may be about 4 mm to about 12 mm, for example about 6.76 mm. Dimension B may be about 1 mm to about 10 mm, for example about 3.04 mm. Angle E may be about 10° to about 90°, for example about 19.49°.

The receiving portion 11 of this embodiment of the connector 10 includes an internal threaded section 111. The internal threaded section 111 is configured such that the fitting of the fluid conduit (not shown) can be secured into position using a complementary external threaded section on the fitting. The length of the internal thread 111 (Dimension J) may be about 3 to about 12 mm, for example about 6.21 mm. This embodiment of the connector 10 includes a sealing recess 12 with an annular connecting face 13 of which Dimension F may be about 0.4 to about 6.5 mm, for example about 1.7 mm, and Dimension K may be about 0 mm to about 10 mm, for example about 1.95 mm.

The connecting passage 14 of this embodiment is located within the intermediate region 18 of the connector 10. In addition, the sealing recess 12 and the capillary holder 100 (which in this embodiment is the capillary recess 15) both extend into the intermediate region 18 of the connector 10. The connecting passage 14 connects the capillary recess 15 to the sealing recess 12 of the receiving portion 11. The connecting passage 14 may have a bore diameter (Dimension M) of from about 0.0001 to 5 mm, for example about 0.35 to about 0.4 mm, such as e.g. about 0.37 mm. The size and shape of the connecting passage 14 will be selected based upon the size and shape of the inner capillary tubing 21. Typically, the connecting passage 14 will be configured permit the inner capillary tubing 21 selected to be received within the connecting passage 14 with the minimum tolerance so as to minimise any potential dead volume around the inner capillary tubing 21. The connecting passage 14 may have a length (Dimension L) of about 0.1 to about 20 mm, for example about 1 mm.

The intermediate region 18 may have a length (Dimension C) of about 1 mm to about 30 mm, for example about 5.5 mm. The diameter of the intermediate region 18 can vary along its length. Dimension G may be from about 2 mm to 20 mm, for example about 3 mm to about 6 mm, such as about 4 mm. The capillary recess 15 terminates at the end face 16 and may have a length (Dimension N) of about 3 mm to about 50 mm, for example about 10.8 mm. The diameter (Dimension I) of the capillary recess 15 may be from about 0.25 mm to about 6.3 mm, for example about 1.5 mm to about 1.65 mm, such as about 1.59 mm.

In this illustrated embodiment, the deformable portion 17 is a crimpable portion 17, and it will be denoted as such in the following description. The diameter (Dimension H) of the crimpable portion 17 may be from about 0.5 mm to about 20 mm. Typically, the diameter of the crimpable portion 17 will be about 30% to about 32% larger than the diameter of the capillary recess 15.

In this embodiment of the connector 10, the receiving portion 11 includes a grippable portion 112 that, as shown in FIG. 3*b*, has a hexagonal cross-section. The grippable portion has been configured with the hexagonal cross-section so that it may be engaged using a tool. A variety of alternative cross-section shapes may be used in other embodiments of the grippable portion 112. The cross-sectional shape and surface finish of the grippable portion 112 may be selected to facilitate gripping of the portion so as to enable the fitting of the fluid conduit to be readily screwed into the connector 10 or removed from the connector 10. In embodiments with a hexagonal cross-section, Dimension O may be about 2 mm to about 20 mm, for example about 6 mm.

Figure 4:
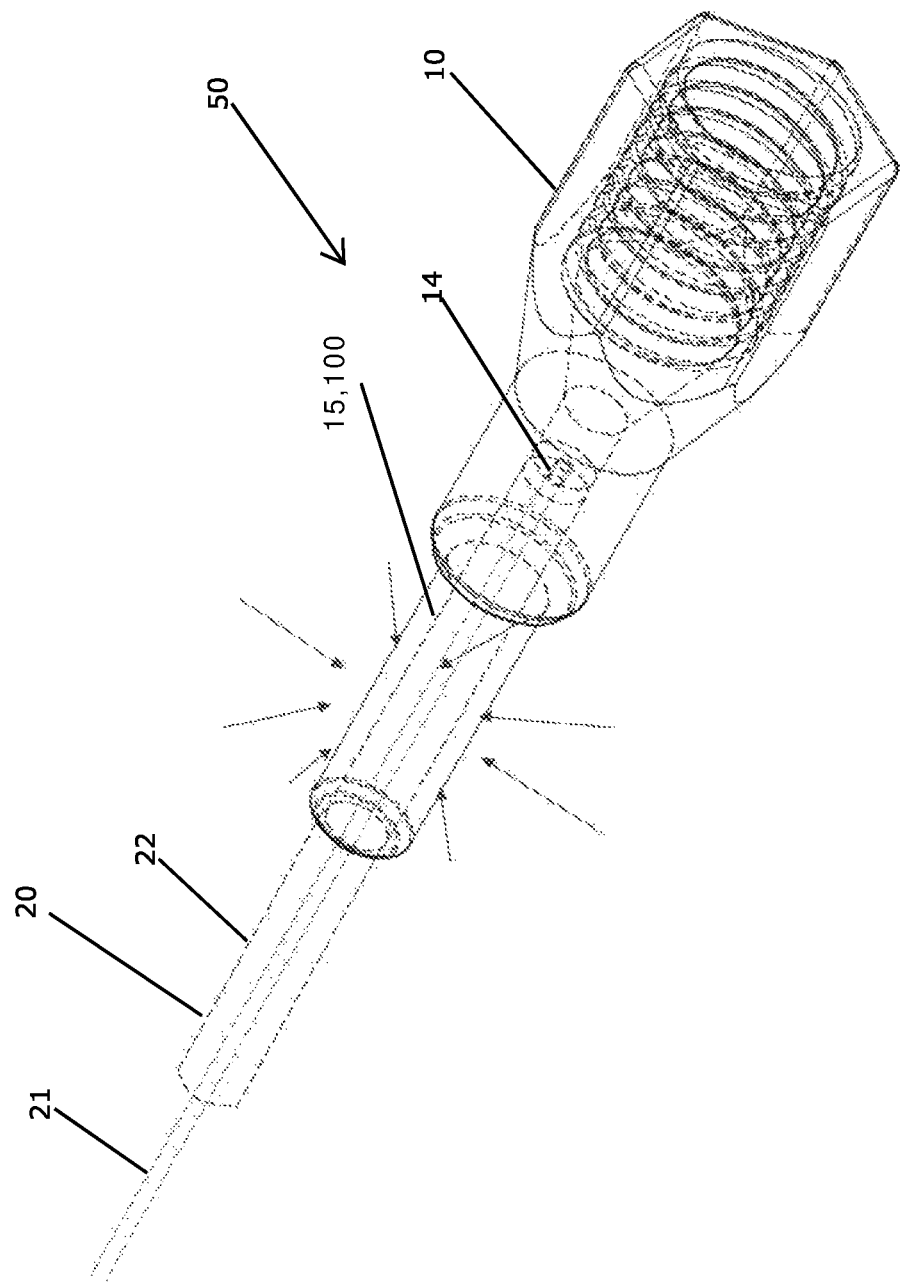
FIG. 4 shows a perspective view of the connector illustrated by FIGS. 3a and 3b.

FIG. 4 shows a perspective view a capillary assembly 50 comprising a connector 10 of the embodiment illustrated by FIGS. 3*a* and 3*b*. In the view shown in FIG. 4, the positioning of the capillary 20, including the inner capillary tubing 21 and the compliant material sleeve 22, within the connector 10 is shown. In FIG. 4, it can be seen that the inner capillary tubing 21 extends along and passes through the capillary recess 15 (i.e. capillary holder 100) into the connecting passage 14. The arrows of FIG. 4 denote the radial compression that occurs when the crimpable portion 17 is crimped.

Figure 5:
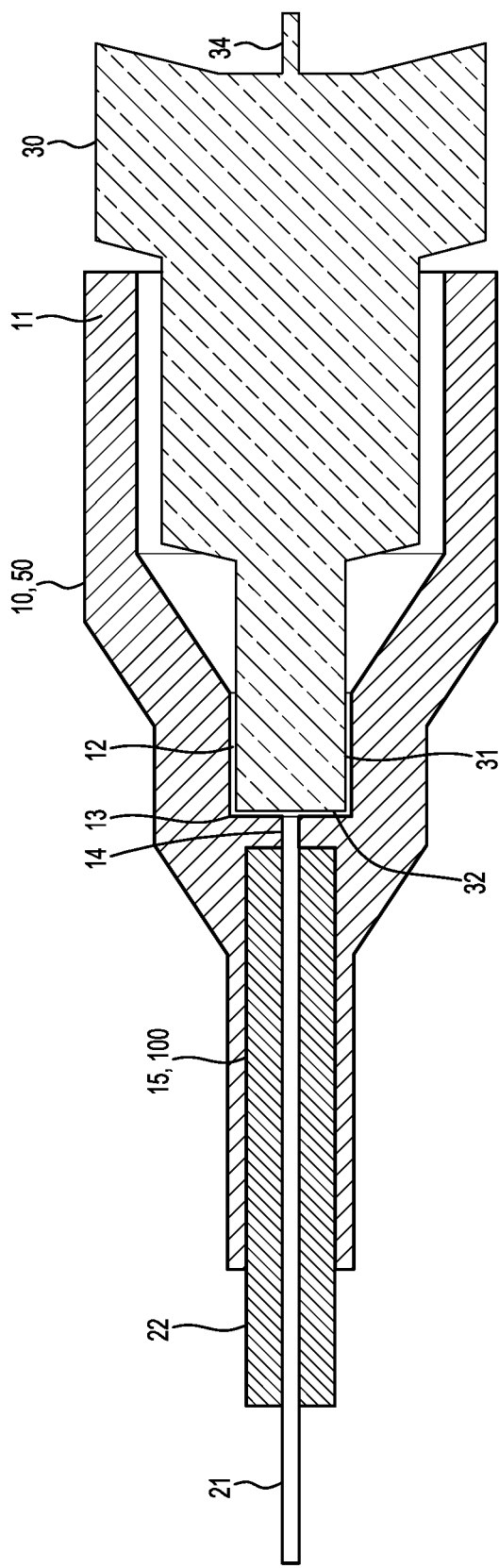
FIG. 5 is a schematic cross-section of the connector illustrated in FIG. 2, with the connecting fitting in situ.

FIG. 5 is a schematic cross-section of a connector 10 and a capillary assembly 50 as described above with reference to FIGS. 1 and 2, with a fitting 30 of a fluid conduit 34 being received by the receiving portion 11. In this figure, the fitting 30 and fluid conduit 34 are shown as a silhouette. The fitting 30 includes a tip 31 with an end 32 and a sealing portion (not shown) is formed at the tip. When the tip is received by the sealing recess 12, such that the end 32 abuts the connecting face 13, a seal with little to no dead volume between the end of the fitting and the connecting face 13 may be formed so that there is little to no dead volume between the end of the fluid conduit 34 and the connector 10. Also, to minimise dead volume the inner capillary tubing 21 extends through the capillary holder 100 (the capillary recess 15) and the connecting passage 14 so that it ends at the connecting face 13. Ideally, the fluid conduit 34 and the inner capillary tubing 21 meet at the connecting face 13. By being located within the connecting passage 14, the end portion of the inner capillary tubing 21 is protected from being damaged or crushed by contact with the fitting 30 so that a reliable connection can be formed with little or no dead volume between the capillary 20 and the fluid conduit 34.

Figure 6:
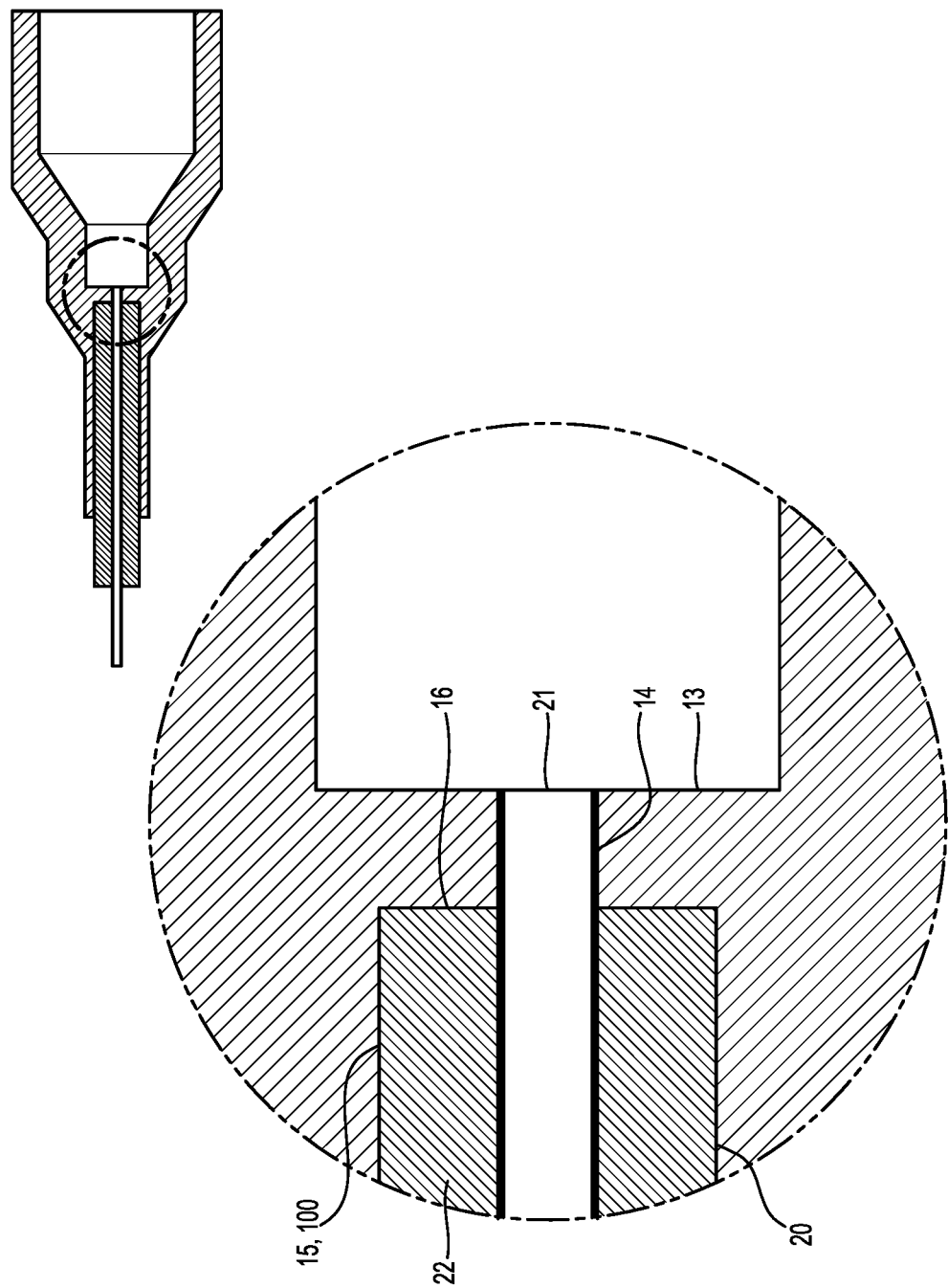
FIG. 6 is an expanded view of the connecting passage of the connector illustrated in FIG. 2.

The positioning of the inner capillary tubing 21 such that it extends all the way through the connecting passage 14 is shown in further detail in FIG. 6. FIG. 6 illustrates the positioning of the inner capillary tubing 21 such that it extends through the connecting passage 14 and is brought in line with the connecting face 13. As described above, the compliant material sleeve 22 of the capillary 20 is located within the capillary holder 100 (the capillary recess 15) such that it typically abuts the end face 16 of the capillary recess 15.

In some alternative embodiments, the end portion of the capillary tubing 21 may extend only part-way along the connecting passage 14. In such embodiments, a minor dead volume will be produced between the end of the inner capillary tubing 21 and the fluid conduit 34.

However, the size of the dead volume should not be such that the dead volume unduly comprises chromatographic system performance. As noted above, it is desirable to minimise or eliminate any dead volume.

Figure 7:
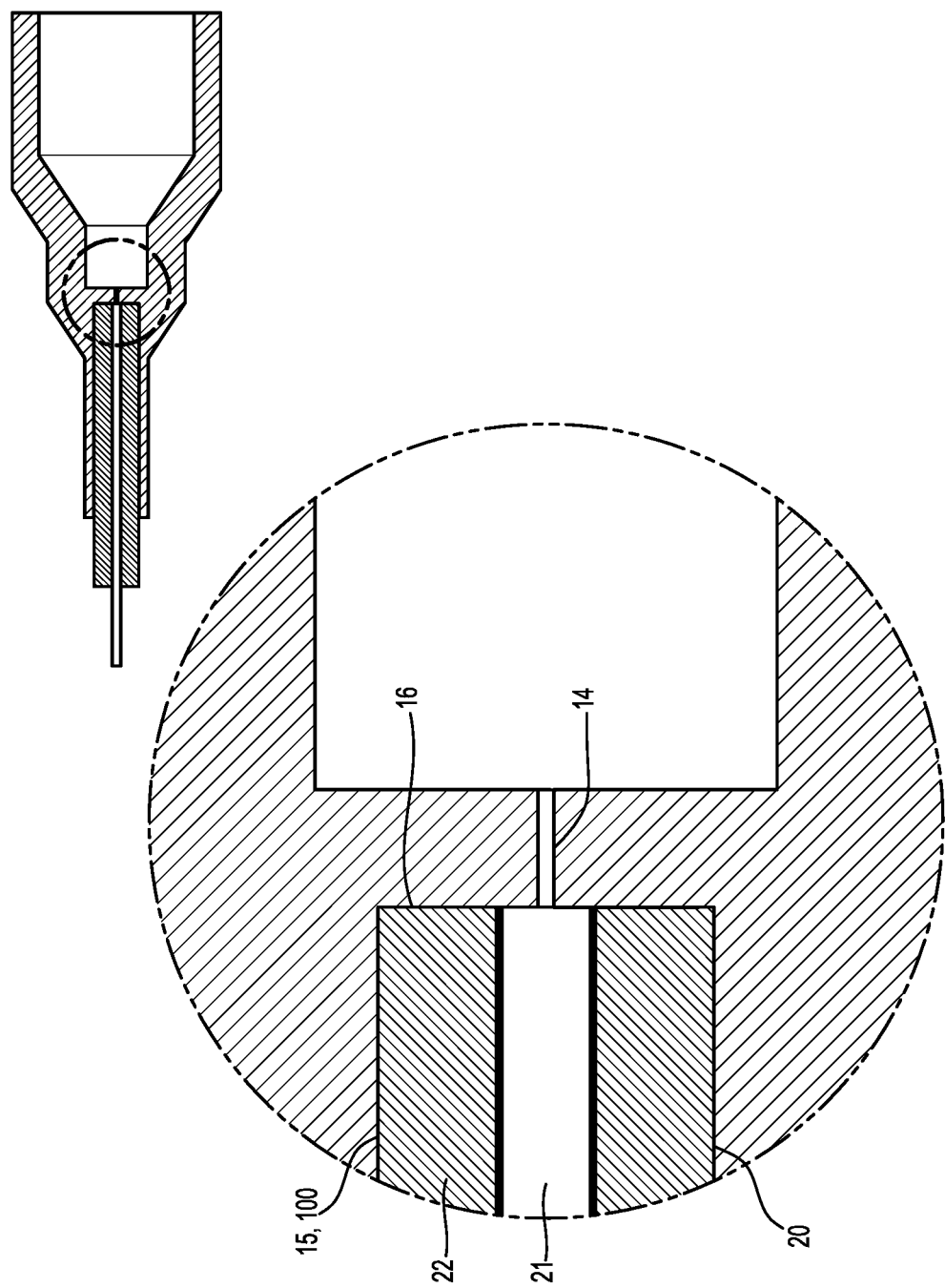
FIG. 7 shows an expanded view of an alternative embodiment of a connecting passage of a connector in accordance with the present invention.

FIG. 7 shows an expanded view of the connecting passage 14 of an alternative embodiment. The connecting passage 14 has a bore diameter that is smaller than that of the inner capillary tubing 21 such that the inner capillary tubing 21 also abuts the end face 16 of the capillary holder 100 (the capillary recess 15), as well as the compliant material sleeve 22. In such embodiments, the connecting passage 14 may be about 5% to about 10% the diameter of the inner capillary tubing 21. For example, the diameter of the connecting passage 14 may be less than about 50 μm, for example less than about 35 μm, such as about 25 μm. It will be appreciated that these embodiments of the connecting passage 14 will define a minor dead volume. However, the dead volume should be such that it does not unduly adversely affect the performance of the chromatography system. As described above, it is desirable to minimise any dead volume.

Figure 8:
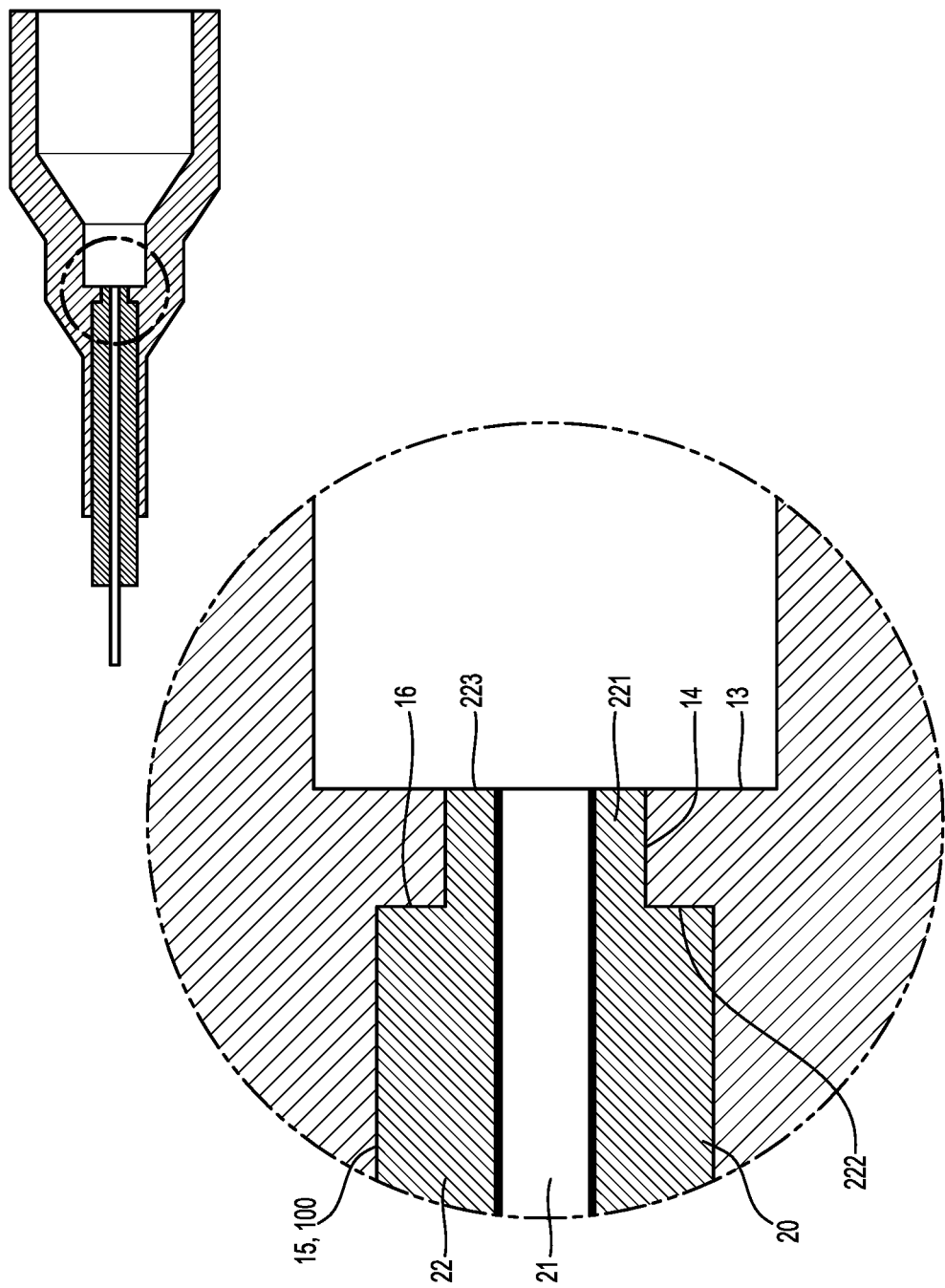
FIG. 8 shows an expanded view of a further embodiment of a connecting passage of a connector in accordance with the present invention.

FIG. 8 shows an expanded view of the connecting passage 14 of another embodiment. The connecting passage 14 has a bore diameter that is larger than that of the inner capillary tubing 21. In this embodiment, the end of the compliant material sleeve 22 is configured so that a first part 221 of the sleeve can be received by the connecting passage 14. The compliant material sleeve 22 has a rebated edge with a face 222 that abuts the end face 16 of the capillary holder 100 (the capillary recess 15) when the first part 221 is received by the connecting passage 14. In such embodiments, the connecting passage 14 may have a bore diameter of from about 0.0001 to 5 mm, for example about 0.5 to about 1.3 mm, such as e.g. about 0.79 mm. The size and shape of the connecting passage 14 will be selected based upon the size and shape of the inner capillary tubing 21 and the first part 221 of the sleeve. The connecting passage 14 may be configured permit the inner capillary tubing 21 and the first part 221 to be received within the connecting passage 14 with the minimum tolerance so as to minimise any potential dead volume.

In the illustrated embodiment, the first part 221 of the compliant material sleeve 22 extends through the connecting passage 14 until the connecting face 13. Thus, in the illustrated embodiment, the first part 221 of the compliant material sleeve 22 provides a compliant connecting face 223 that is aligned with the connecting face 13. In addition, the inner capillary tubing 21 also extends to the connecting face so as to minimise any dead volume. In some embodiments, the first part 221 of the compliant material sleeve 22 may extend a small distance into the sealing recess 12 to provide a compliant connecting face 223 that can contact the fitting 30 before the fitting 30 contacts the connecting face 13. The compliant connecting face 223 may deform with contact from the fitting 30 so that there is an improved connection between the capillary 20 and the conduit 34, with reduced or no dead volume. In some embodiments, the first part 221 may extend up to 1 mm past the connecting face 13, for example up to about 0.2 mm, such as about 0.02 mm. Typically, the inner capillary tubing 21 will not extend past the connecting face 13 or the compliant connecting face 223 so at to minimise the risk of the inner capillary tubing being damaged by the fitting 30.

In some alternative embodiments, the end portion of the capillary tubing 21 and/or the first part 221 may extend only part-way along the connecting passage 14. In such embodiments, a minor dead volume will be produced between the end of the inner capillary tubing 21 and the fluid conduit 34. However, the size of the dead volume should not be such that the dead volume unduly comprises chromatographic system performance. As noted above, it is desirable to minimise or eliminate any dead volume.

Figure 9:
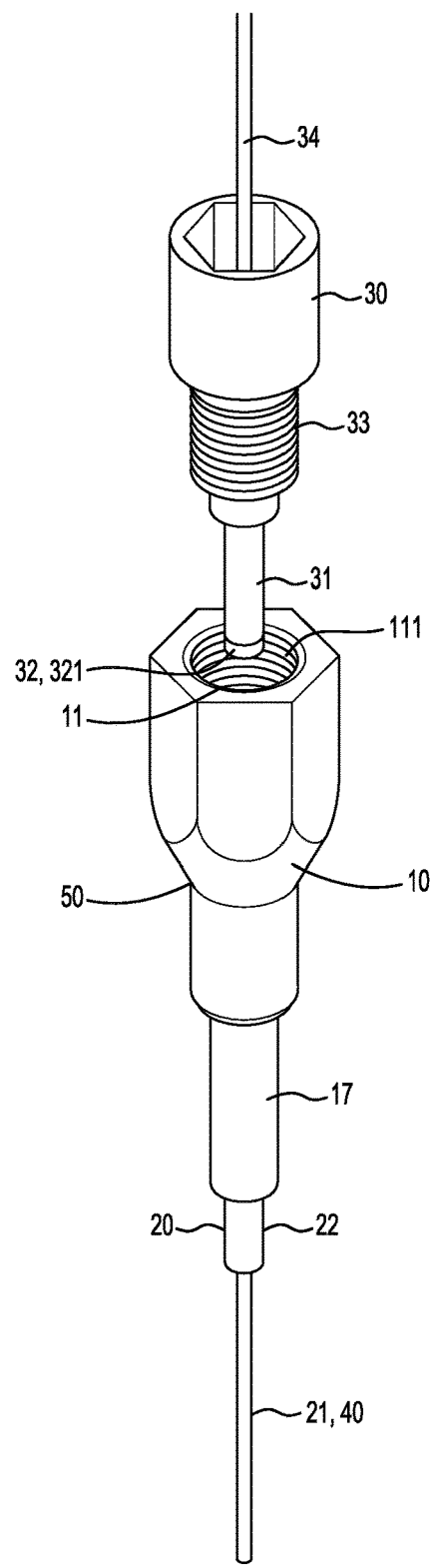
FIG. 9 shows a perspective view of a connector of the type illustrated in FIGS. 3a, 3b, and 4, together with a fitting.

FIG. 9 illustrates a capillary assembly 50 including a connector 10 of the type illustrated in FIGS. 3a, 3b, and 4. FIG. 9 also shows a fitting 30 in position for receipt in the receiving portion 11 of the connector 10. The connector 10 includes an internal threaded section 111. The internal threaded section 111 is configured such that the fitting 30 of the fluid conduit 34 can be secured into position using a complementary external threaded section 33 of the fitting 30. The fluid conduit 34 of this illustrated embodiment is a capillary from a UHPLC device (not shown).

The fitting 30 includes a tip 31 with an end 32, and a sealing portion 321 is at the end 32.

An end of a capillary 20 is crimped within the crimpable portion 17 of the connector 10 so that the compliant material sleeve 22 is deformed to create a seal between the inner capillary tubing 21 and the connector 10 and form a capillary assembly 50. It can be seen that compliant material sleeve 22 extends past the end of the connector 10, but does not extend along the entire length of the inner capillary tubing 21. The inner capillary tubing 21 forms part of a chromatography column 40 (only partially shown).

Figure 10:
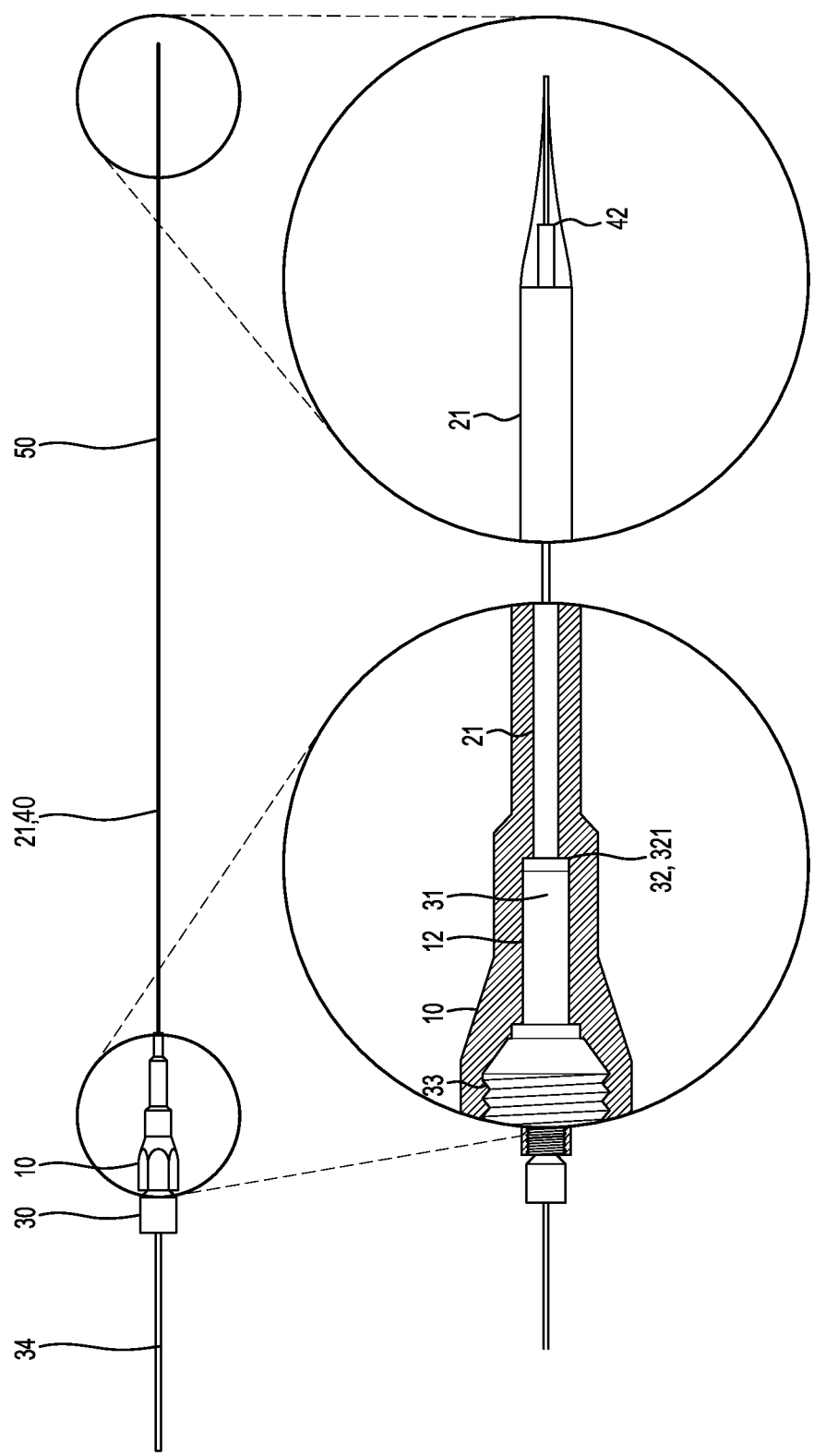
FIG. 10 shows a chromatography column in fluid connection with a fitting using an embodiment of a connector of the present invention.

FIG. 10 shows a capillary assembly 50 connected to a fitting 30. The capillary assembly 50 illustrated includes a chromatography column 40 and a connector 10. The connector 10 shown in FIG. 10 is of the same type as that shown in FIGS. 3a, 3b, 4 and 9. The fitting 30 illustrated in this figure is of the same type as the fitting 30 shown in FIG. 9.

Using the connector 10, a fluid connection is provided between the fluid conduit 34 and the inner capillary tubing 21. The inner capillary tubing 21 forms part of the chromatography column 40. The chromatography column 40 comprises an integrated electrospray emitter 42 at the other end of the column 40 from the connector 10.

In the expanded view of the connector 10 shown in FIG. 10, a cross-section view of the connector 10 is provided so the position of the fitting 30 within the connector 10 can be seen. The fitting 30 has been screwed into the connector 10, using the complementary external threaded section 33, so that the tip 31 is inserted into the sealing recess 12. A sealing portion 321 is at an end 32 of the tip 31 of the fitting 30, and the sealing portion 321 may be deformed against the walls of the sealing recess 12 as a result of the axial load exerted by screwing the fitting 30 into the connector 10. Ideally, the fitting 30 and the capillary 20 are received by the connector 10 so that the inner capillary tubing 21 and the end 32 of the fitting 30 abut to provide a fluid connection with no (or minimal) dead volume.

Figure 11:
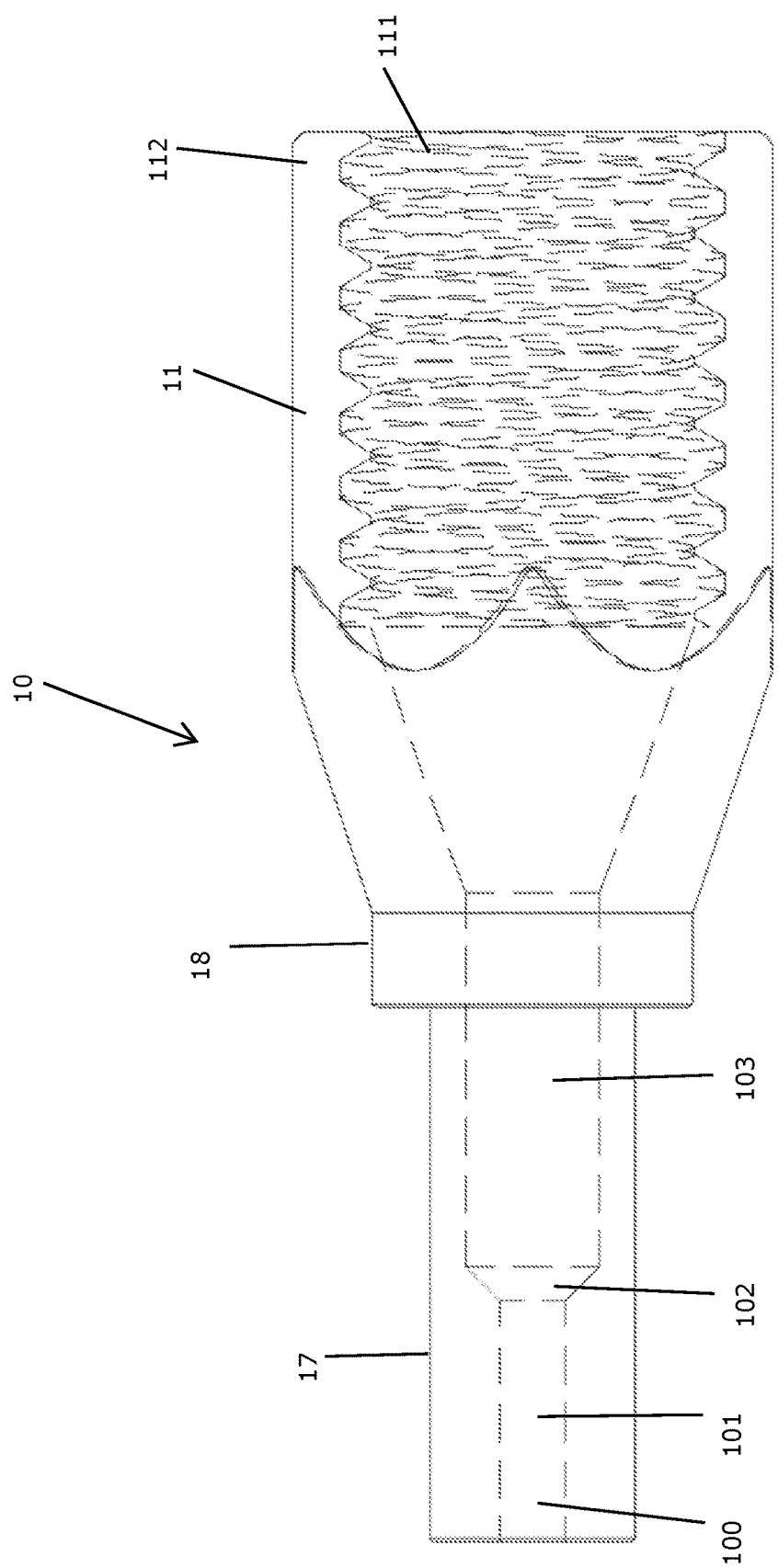
FIG. 11 is a side view of an embodiment of a connector in accordance with the second aspect of the present invention.

FIG. 11 shows a side view of an embodiment of the connector 10 in accordance with the second aspect of the present invention. The connector 10 is configured for use with a fitting having a tip with a sealing element on the end, such as a Thermo Scientific™ Viper™ or nanoViper™ fitting or the connector unit described in US Patent Publication No. 2014/0145437. In FIG. 11, hidden features are shown in broken lines.

The connector 10 has a capillary holder 100 that includes a first section 101 and a sleeve section 103 with a tapered region 102. The sleeve section 103 is configured to receive the compliant material sleeve (not shown). The sleeve section 103 extends into the receiving portion 11. That is, the connector 10 does not include a connecting passage.

In this illustrated embodiment, the deformable portion 17 is a crimpable portion 17, and it will be denoted as such in the following description. The capillary holder 100 extends along the entire length of the crimpable portion 17 and into the intermediate region 18. When the compliant material sleeve is in place, the sleeve will define a sealing recess at the end of the sleeve section 103. This sealing recess is the part into which the tip of the fitting can be inserted such that it abuts the connecting face of the compliant material sleeve so that there is a suitable seal between the connector 10 and the fluid conduit. Typically, the portion of the sleeve section 103 that is in the intermediate region 18 will form the sealing recess when the sleeve is in situ. It is desirable that the sealing recess have dimensions that closely correspond to those of the tip of the fitting so as to minimise any dead volume. Thus, it may be beneficial to form the sealing recess with the portion of the sleeve section 103 in the intermediate region 18, rather than in the crimpable portion 17, so as to minimise the risk of the dimensions of the recess being changed.

In this embodiment of the connector 10, the receiving portion 11 includes a grippable portion 112 that has a hexagonal cross-section. The grippable portion has been configured with the hexagonal cross-section so that it may be engaged using a tool. A variety of alternative cross-section shapes may be used in other embodiments of the grippable portion 112. The cross-sectional shape and surface finish of the grippable portion 112 may be selected to facilitate gripping of the portion so as to enable the fitting of the fluid conduit to be readily screwed into the connector 10 or removed from the connector 10. The receiving portion 11 of this embodiment of the connector 10 also includes an internal threaded section 111. The internal threaded section 111 is configured such that the fitting of the fluid conduit (not shown) can be secured into position using a complementary external threaded section on the fitting.

Figure 11A:
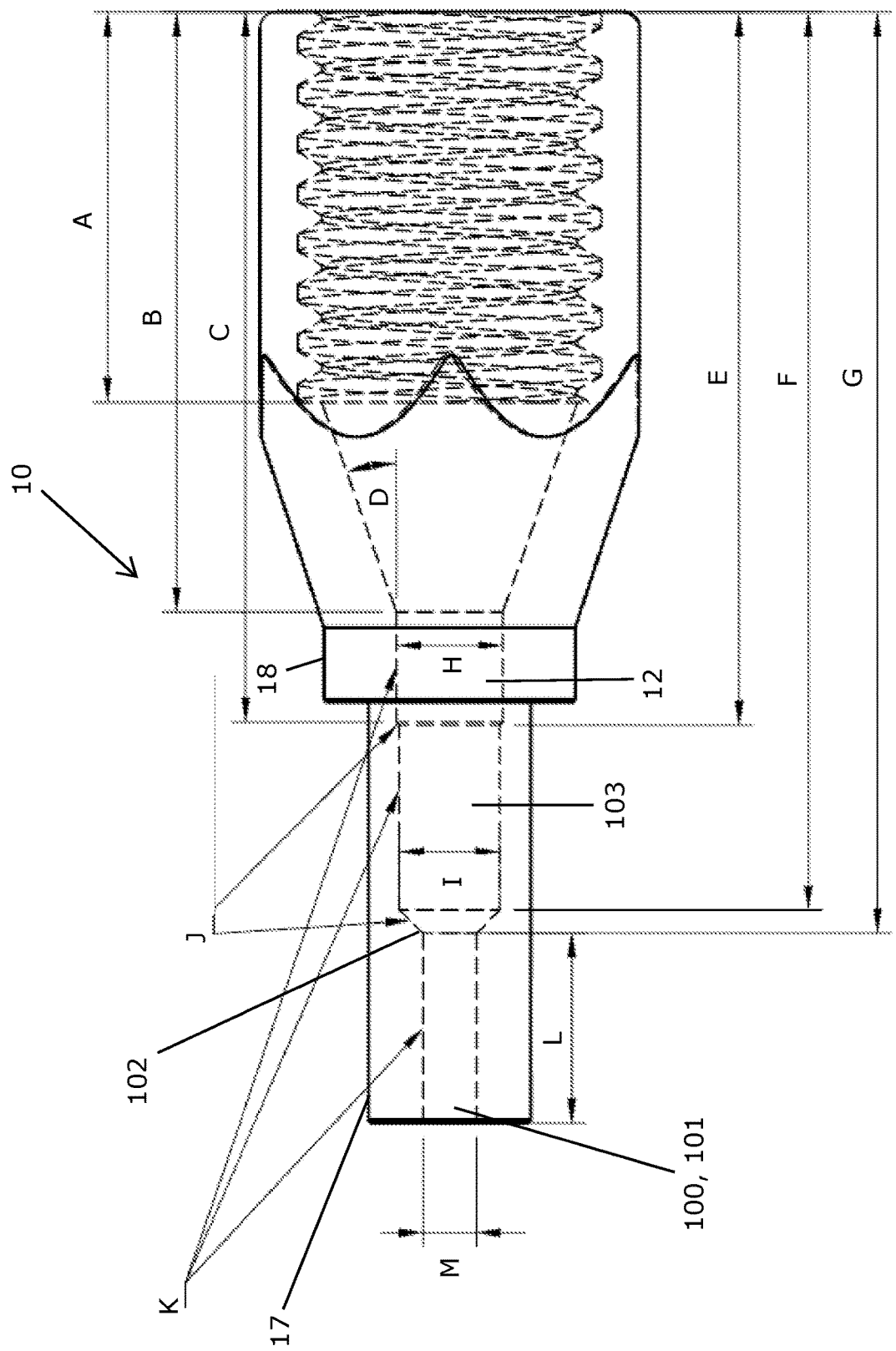
FIGS. 11a, 11b, 11c and 11d are, respectively, a side view, a rear view, a top view and a rear perspective view of an embodiment of a connector in accordance with the second aspect of the present invention.
Figure 11B:
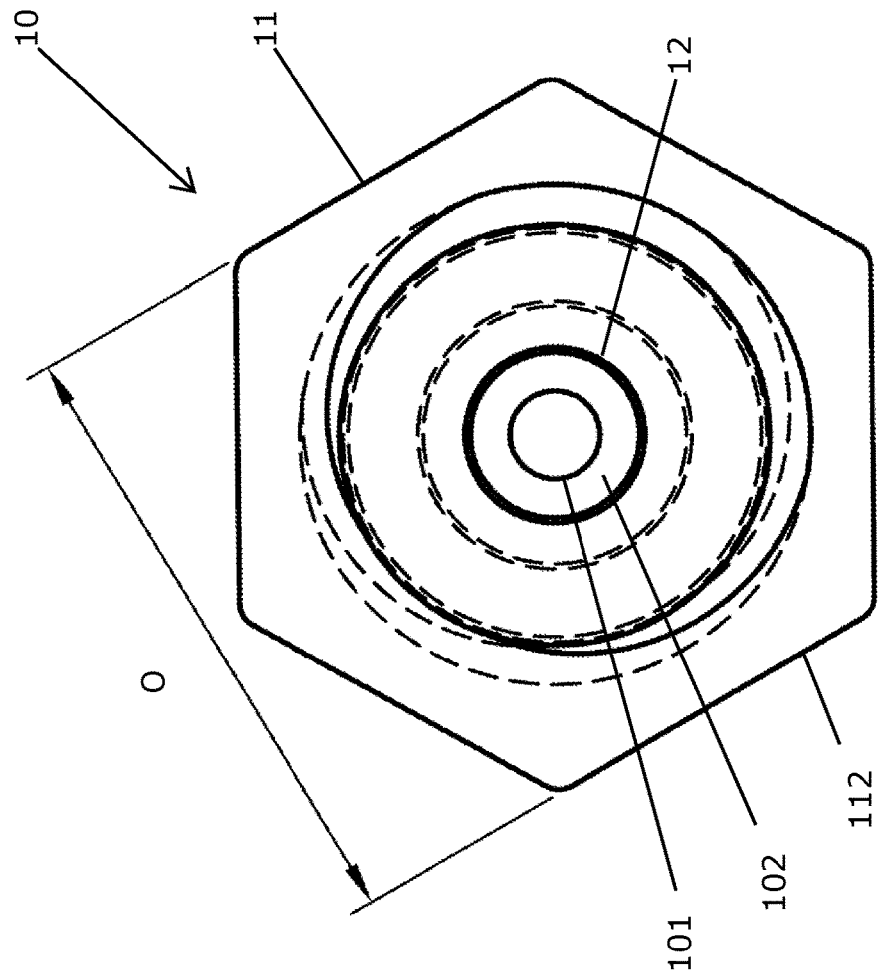
Figure 11C:
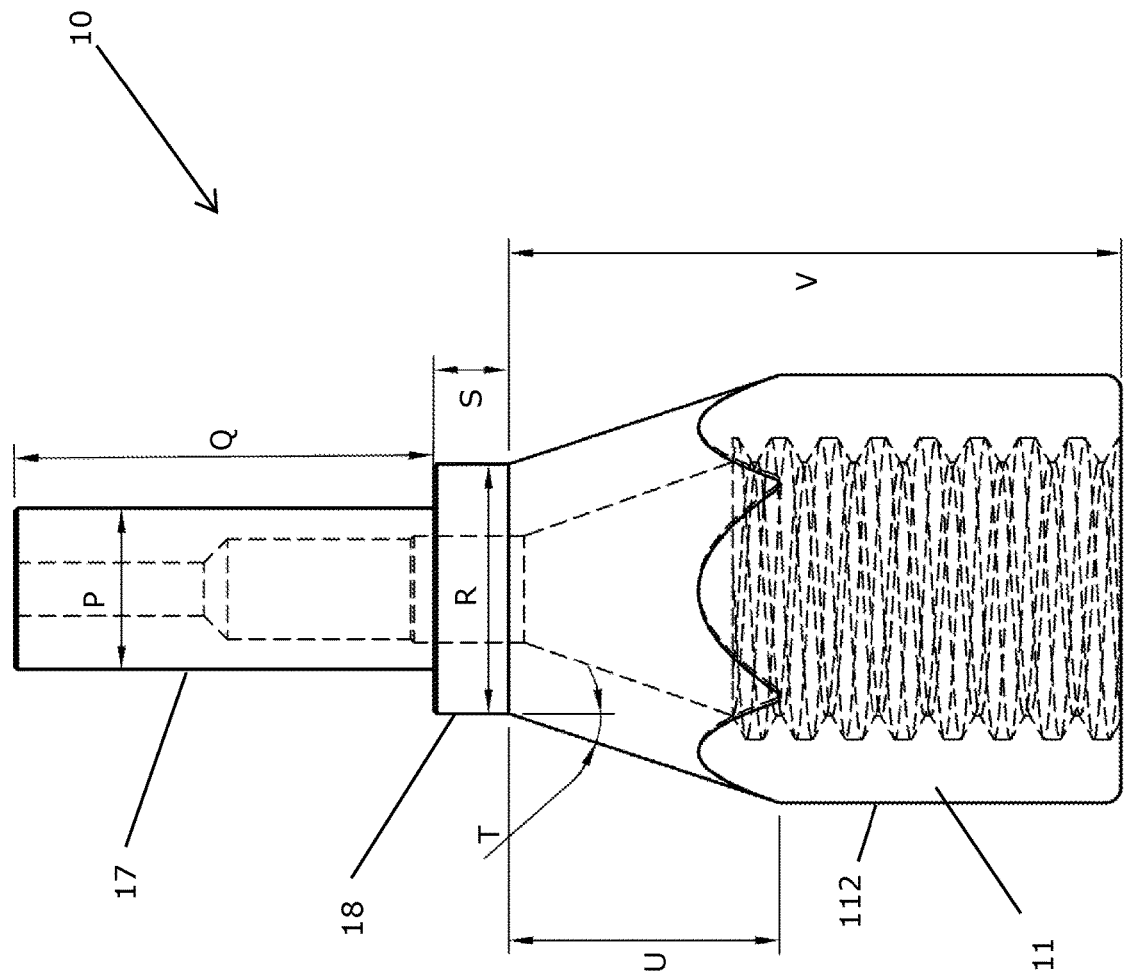
Figure 11D:
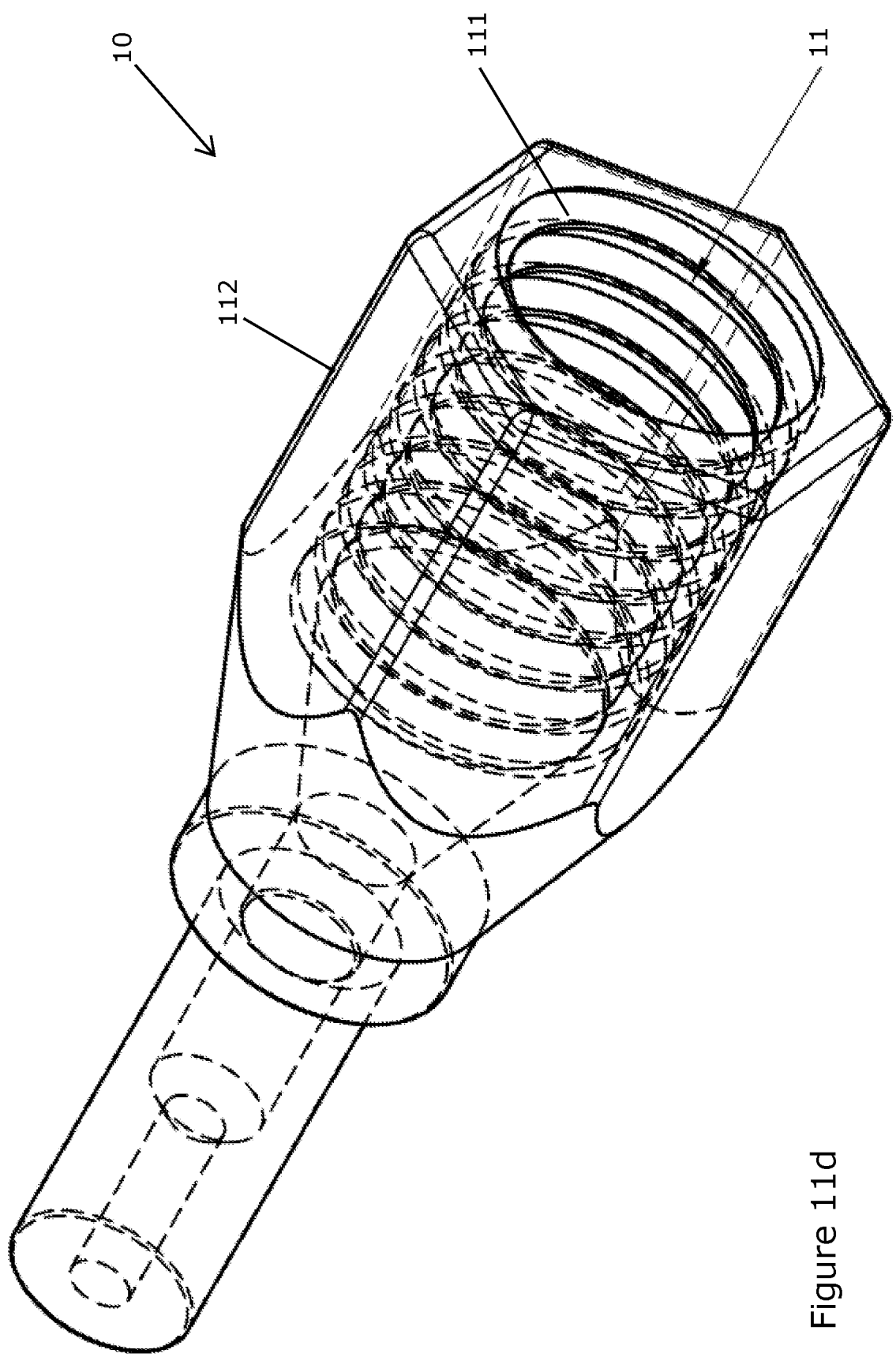

FIGS. 11a, 11b, 11c and 11d illustrate another embodiment of the connector 10 in accordance with the second aspect of the present invention. FIG. 11a is a side view of the connector 10, FIG. 11b is a rear view, FIG. 11c is a top view, and FIG. 11d is a perspective rear view. Like the embodiment of FIG. 11, this embodiment of the connector 10 is configured for use with a fitting having a tip with a sealing element on the end, such as a Thermo Scientific™ Viper™ or nanoViper™ fitting or the connector unit described in US Patent Publication No. 2014/0145437. In FIGS. 11a-11d, hidden features are shown in broken lines.

The overall length of the connector 10 may be about 5 mm to about 100 mm, for example, about 15 mm to about 50 mm, for example about 17.71 mm. Dimension B may be about 5 mm to about 22 mm, for example about 9.55 mm. Dimension C may be about about 5 mm to about 26 mm, for example about 11.32 mm. Angle D may be about 10° to about 90°, for example about 19.49°.

The receiving portion 11 of this embodiment of the connector 10 includes an internal threaded section 111. The internal threaded section 111 is configured such that the fitting of the fluid conduit (not shown) can be secured into position using a complementary external threaded section on the fitting. The length of the internal thread 111 (Dimension A) may be about 3 mm to about 12 mm, for example about 6.21 mm. This embodiment of the connector 10 includes a sealing recess 12 of which Dimension H may be about 0.4 to about 6.5 mm, for example about 1.7 (±0.050) mm.

The connector 10 has a capillary holder 100 that includes a first section 101 with a diameter (Dimension M) of 0.20 mm to about 6.3 mm, for example about 0.5 mm to about 1.65 mm, such as about 0.85 (±0.050) mm. The length (Dimension L) of the first section 101 may be about 1.5 mm to about 6 mm, for example about 3.03 mm. The capillary holder 100 also includes a sleeve section 103 with a tapered region 102. The diameter of the sleeve section 103 (Dimension I) may be about 0.25 to about 6.3 mm, for example about 0.5 mm to about 1.8 mm, such as about 1.6 (±0.050) mm. The sleeve section 103 is configured to receive the compliant material sleeve (not shown). The tapered portion 102 and the transition from the sleeve section 103 are both a chamfer (J) that may be about 30° to about 60°, such as about 45°. It will be appreciated that the dimensions of the capillary holder 100 will be determined, in part, by the dimensions of the inner capillary tubing and whether it includes and secondary compliant material sleeve, in addition to the compliant material sleeve that is to be received in the sleeve section 103.

Dimension F may be about about 6.5 mm to about 29 mm, for example about 14.3 mm. Dimension G may be about about 7 mm to about 30 mm, for example about 14.68 mm.

The sealing recess 12 of this embodiment extends through the intermediate region 18 of the connector 10. The intermediate region 18 may have a length (Dimension S) 0.5 mm to about 30 mm, for example about 0.75 mm to about 5 mm, such as about 1.2 mm. The diameter (Dimension R) of the intermediate region 18 may be from about 2 mm to about 20 mm, for example about 3 mm to about 6 mm, such as about 4 mm.

The tolerance of the diameter of each of the first section 101, sleeve section 103 and sealing recess 12 is ±0.050 mm (Dimension K).

In this illustrated embodiment, the deformable portion 17 is a crimpable portion 17, and it will be denoted as such in the following description. The diameter (Dimension P) of the crimpable portion 17 may be from about 0.5 mm to about 20 mm, such as about 2.59 mm. Typically, the diameter of the crimpable portion 17 will be about 30% to about 100% larger, such as about 62% larger, than the diameter of the sleeve section 103. The length (Dimension Q) of the deformable portion 17 may be from about 3 mm to about 20 mm, such as about 6.7 mm.

In this embodiment of the connector 10, the receiving portion 11 includes a grippable portion 112 that, as shown in FIGS. 11b and 11d, has a hexagonal cross-section. The grippable portion 112 has been configured with the hexagonal cross-section so that it may be engaged using a tool. A variety of alternative cross-section shapes may be used in other embodiments of the grippable portion 112. The cross-sectional shape and surface finish of the grippable portion 112 may be selected to facilitate gripping of the portion so as to enable the fitting of the fluid conduit to be readily screwed into the connector 10 or removed from the connector 10. In embodiments with a hexagonal cross-section, Dimension O may be about 2 mm to about 20 mm, for example about 6 mm.

The receiving portion may extend at an angle (Angle T) of about 10° to about 60°, such as about 15° to about 25°, for example about 18.21°, from the intermediate portion 18 to the grippable portion 112. The distance (Dimension U) between the intermediate portion 18 and the grippable portion 112 may be about may be about 2 mm to about 15 mm, for example about 4.33 mm. The length (Dimension V) from the end of the receiving portion 11 to the intermediate portion 18 may be about may be about 5 mm to about 22 mm, for example about 9.8 mm.

Figure 12:
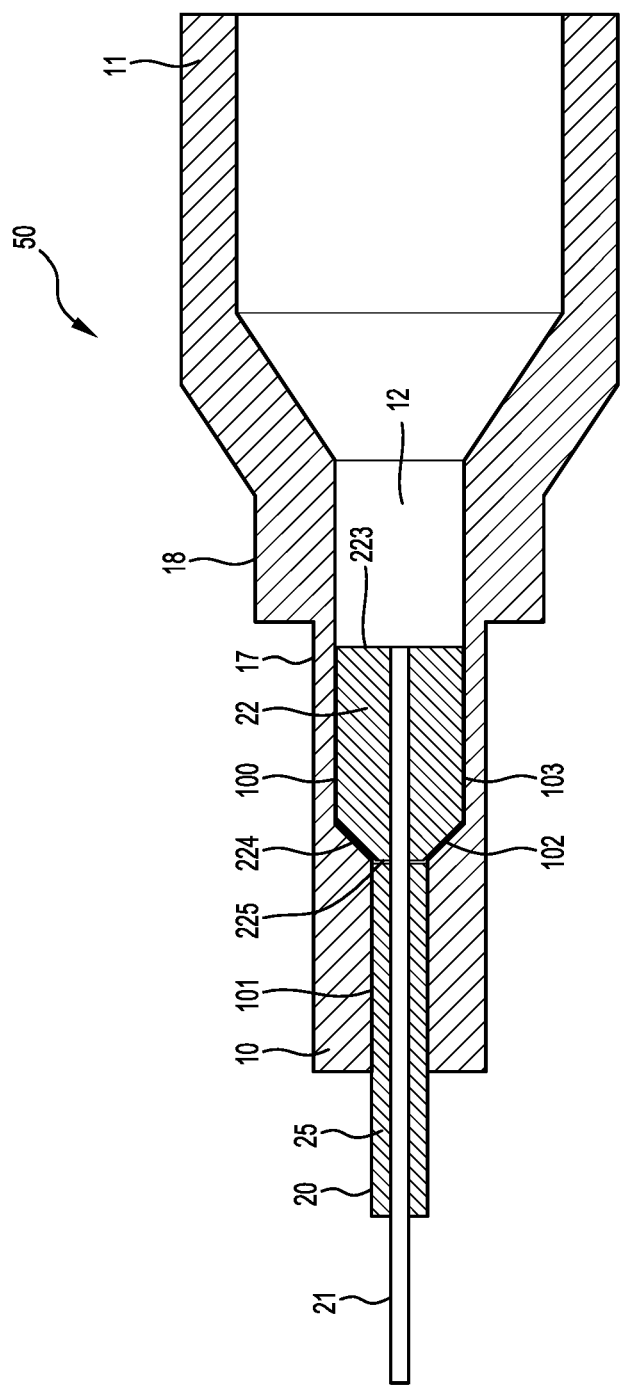
FIG. 12 is a schematic cross-section of a connector, with the capillary in situ.

FIG. 12 is a schematic cross-section of another embodiment of the connector 10 of the second aspect with the capillary 20 in situ. Thus, FIG. 12 illustrates a capillary assembly 50 in accordance with the present invention. The illustrated embodiment of the connector 10 is one suitable for use in chromatographic systems. In this schematic representation of the connector 10, engagement components on the receiving portion 11 (for receiving the fitting in the receiving portion and retaining it there) have been omitted.

Figure 13:
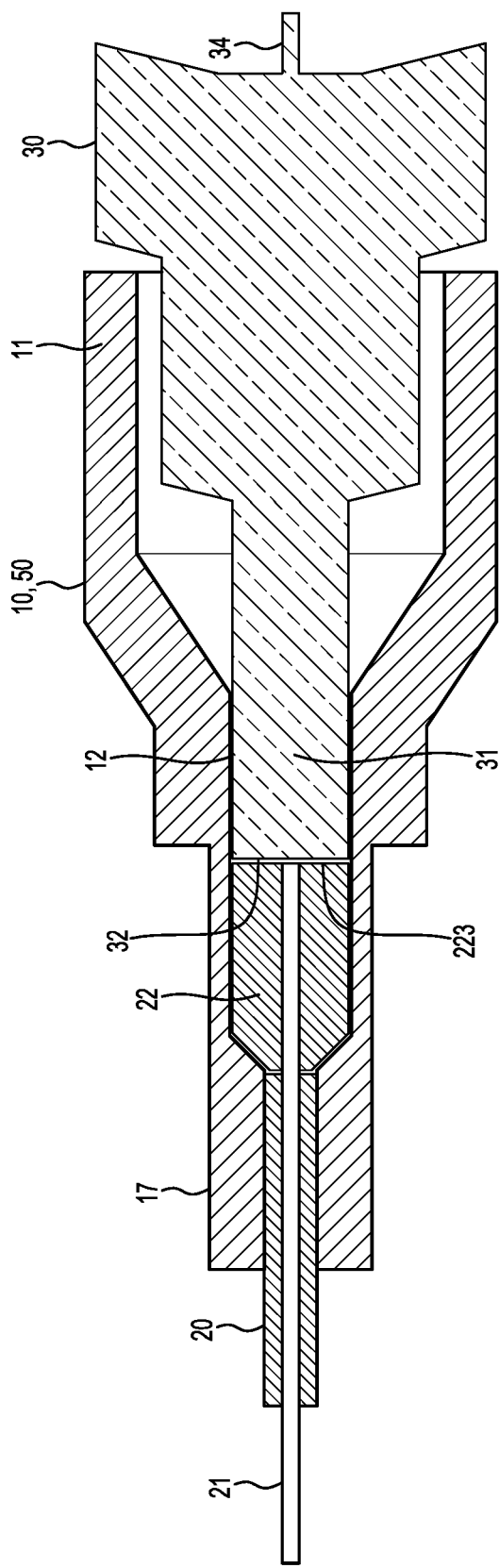
FIG. 13 is a schematic cross-section of the connector illustrated in FIG. 12, with the connecting fitting in situ.

The connector 10 includes a receiving portion 11 that is configured to receive a fitting at an end of a separate fluid conduit (not shown, see FIG. 13). The size, shape and configuration of the receiving portion 11, in particular the inner dimensions of the receiving portion 11, will be determined by the size, shape and configuration of the fitting of the fluid conduit.

The embodiment shown in FIG. 12 is an embodiment of the connector 10 that may be configured for use with a fitting having a tip with a sealing element on the end, such as a Thermo Scientific™ Viper™ or nanoViper™ fitting or the connector unit described in US Patent Publication No. 2014/0145437.

The connector 10 includes a deformable portion 17. In this illustrated embodiment, the deformable portion 17 is a crimpable portion 17, and it will be denoted as such in the following description. The crimpable portion 17 is a crimpable sleeve that surrounds the inner capillary tubing 21 at the end of the capillary 20. The wall thickness of the crimpable portion 17 and the dimensions of the capillary holder 100, particularly the sleeve section 103, will be selected so that the capillary holder may accommodate the capillary 20 when the crimpable portion 17 is uncrimped, but that when the crimpable portion 17 is crimped the compliant material sleeve 22 deforms so that a seal is formed between the inner capillary tubing 21 and the connector 10 by the compliant material sleeve 22.

It may not be necessary to crimp the entire crimpable portion 17 so as to create a seal. Instead, only part of the crimpable portion 17 may need to be crimped so as to form an effective seal. For example, the crimpable portion 17 may only require crimping along a length of 2 to 3 mm in order to form an effective seal. It will be appreciated that such crimping will typically be focused on the region of the crimpable portion surrounding the compliant material sleeve 22.

The compliant material sleeve 22 located within the sleeve section 103 provides a compliant connecting face 223 and an end face 225. Thus, in this embodiment of the second aspect, the compliant material sleeve 22 replaces the connecting passage 14, end face 15 and connecting face 13 of the embodiment illustrated in FIG. 1. As shown in FIG. 12, the compliant connecting face 223 is at the end of the sleeve 22 proximal to the receiving portion 11 and the end face 225 is at the end of the sleeve 22 distal to the receiving portion 11.

The receiving portion 11 and the compliant material sleeve 22 in the sleeve section 103 define a sealing recess 12 into which the tip of the fitting can be inserted such that it abuts the compliant connecting face 223 so that there is a suitable seal between the connector 10 and the fluid conduit. Typically, the receiving portion 11 is configured such that the fluid conduit is located so that it is co-axial with the sleeve 22 and the capillary holder 100 so that the capillary 20 received in the capillary holder 100, in particular the inner capillary tubing 21, is aligned with the fluid conduit. The sealing recess 12 is formed from the part of the sleeve section 103 that extends into the intermediate region 18, although it also extends into the crimpable portion 17. As noted above with respect to FIG. 11, it may be beneficial to form the sealing recess with the portion of the sleeve section 103 in the intermediate region 18, rather than in the crimpable portion 17 so as to minimise the risk of the dimensions of the recess being changed.

FIG. 12 shows a capillary 20 including the inner capillary tubing 21 and a secondary compliant material sleeve 25 received by the capillary holder 100. The inner capillary tubing 21 of the capillary 20 is not shown in cross-section. The capillary 20 may be provided with the secondary compliant material sleeve 25 such that the sleeve 25 extends at least along the length of the first section 101. The secondary compliant material sleeve 25 has a smaller diameter than the compliant material sleeve 22, and the bore of the first section 101 is correspondingly smaller than the sleeve section 103. The secondary compliant material sleeve 25 may have an outer diameter from about 0.4 mm to about 5 mm, such as from about 0.5 mm to about 1.6 mm, for example, about 0.79 mm. The sleeve section 103 includes a tapered region 102. The compliant material sleeve is provided with a complementary tapered part 224. The complementary features at the end of the sleeve section 103 and the compliant material sleeve 22 may facilitate centring the sleeve 22 so that it is co-axial with the inner capillary tubing 22 and the fluid conduit. Various alternative complementary features may be selected to assist with properly locating the sleeve 22 during assembly of the capillary assembly 50.

In the illustrated embodiment, the capillary 20 has a section at the end without the secondary compliant material sleeve 25 so that the inner capillary tubing 21 can be inserted into the compliant material sleeve 22. The compliant material sleeve 25 may protect the inner capillary tubing from damage when the crimpable portion 17 is crimped to create the seal. In some embodiments, the secondary compliant material sleeve 25 may contribute to the seal between the inner capillary tubing 21 and the connector 10.

The secondary compliant material sleeve 25 may be provided along substantially the entire length of the inner capillary tubing 21. In such embodiments, the compliant material sleeve 22 may be configured to receive both the inner capillary tubing 21 and secondary compliant material sleeve 25, by having a suitably sized passage. However, in the illustrated embodiment, the end of the secondary compliant material sleeve 25 ideally abuts the end face 225 of the compliant material sleeve 22 when the crimpable portion 17 is crimped.

To minimise or substantially eliminate any dead volume between the fitting of the fluid conduit (not shown) and the inner capillary tubing 21, the inner capillary tubing 21 extends at least part-way and preferably along the entire length (as shown in FIG. 12) of the compliant material sleeve 22.

FIG. 13 is a schematic cross-section of a capillary assembly 50 as described above with reference to FIG. 12, with a fitting 30 of a fluid conduit 34 being received by the receiving portion 11. In this figure, the fitting 30 and fluid conduit 34 are shown as a silhouette. The fitting 30 includes a tip 31 with an end 32 and a sealing portion (not shown) is formed at the tip. When the tip 31 is received by the sealing recess 12, such that the end 32 abuts the compliant connecting face 223, a seal with little to no dead volume between the end of the fitting 30 and the compliant connecting face 223 may be formed so that there is little to no dead volume between the end of the fluid conduit 34 and the connector 10. The compliant material of the sleeve 22 may facilitate forming a good seal between the end 32 of the tip 31 and the sleeve 22. Also, to minimise dead volume the inner capillary tubing 21 extends through the capillary holder 100 and the compliant material sleeve 22 so that it ends at the compliant connecting face 223. Ideally, the fluid conduit 34 and the inner capillary tubing 21 meet at the compliant connecting face 223. By being located within the compliant material sleeve 22, the end portion of the inner capillary tubing 21 is protected from being damaged or crushed by contact with the fitting so that a reliable connection can be formed with little or no dead volume between the capillary 20 and the fluid conduit 34.

The inner capillary tubing 21 may extend to an intermediate position along the compliant material sleeve 22, but it will be positioned suitable close to the end so that the crimping of the crimpable portion 17 does not deform the compliant material sleeve 22 so that it closes in front of the tubing 21. That is, the inner capillary tubing 21 will be positioned within the passage of the sleeve 22 such that deformation of the sleeve 22 does not cause the tubing 21 to be blocked or create a detrimental constriction of the fluid connection.

A method of assembling a capillary assembly according the present invention is also provided. The method comprises: inserting an end of the capillary into the capillary holder;

and deforming the deformable portion so that the compliant material is deformed to create a seal between the inner capillary tubing and the connector. In the first aspect of the invention, the method comprises inserting an end of the capillary into the capillary recess; and deforming the deformable portion so that the compliant material is deformed to create a seal between the inner capillary tubing and the connector.

As shown in FIGS. 1, 3a and 3b, in some embodiments of the present invention, the deformable portion comprises a crimpable portion. For embodiments using a connector in which the deformable portion comprises a crimpable portion, deforming the deformable portion can comprise:

crimping the crimpable portion so that the compliant material is deformed to create a seal between the inner capillary tubing and the connector. Crimping may be performed using a conventional crimper (crimping tool) such as a crimper used for preparing electrical connections. Crimping may be conducted using a manually-actuated crimper.

In the first aspect, the capillary comprises inner capillary tubing within a compliant material sleeve. During assembly of the capillary assembly of the first aspect, often the capillary is inserted into the capillary recess so that the capillary contacts at least the end face of the capillary recess. For example, capillary may be inserted into the capillary recess so that the face at the end of the compliant material sleeve may contact the end face of the recess.

In embodiments where the connecting passage is configured to receive the inner capillary tubing, the method of assembling the capillary assembly may comprise, before deforming the deformable portion: displacing the inner capillary tubing relative to the compliant material sleeve so that an end portion of the inner capillary tubing is inserted into the connecting passage.

In embodiments where the connecting passage is configured to receive the inner capillary tubing and part of the compliant material sleeve, the method may comprise: inserting the part of the compliant material sleeve into the connecting passage so that a second part of the compliant material sleeve abuts the end face. The inner capillary tubing may then be displacing the relative to the compliant material sleeve so that an end portion of the inner capillary tubing is aligned with, or close to, the end of the first part of the compliant material sleeve.

In embodiments in which the connecting passage extends between an end face of the capillary recess and a connecting face of the receiving portion, the method may comprise:
 inserting a dummy part into the receiving portion so that the dummy part abuts the connecting face and extends across the connecting passage; and
 displacing the inner capillary tubing relative to the compliant material sleeve so that the end portion of the inner capillary tubing is inserted into the connecting passage until the inner capillary tubing contacts the dummy part at the connecting face. In embodiments where the connecting passage is configured to receive the inner capillary tubing and a first part of the compliant material sleeve, the dummy part can be used to align the end of the first part of the compliant material sleeve with the connecting face.

In embodiments where the end portion of the inner capillary tubing is inserted into an intermediate position along the connecting passage, the method may still comprise using the dummy part so as to prevent the end portion of the inner capillary tubing being inserted too far through the connecting passage. It is undesirable for the inner capillary tubing to be inserted so far through the connecting passage that part of the end portion extends past the connecting face of the receiving portion. This part of the inner capillary tubing that extends into the receiving portion may be crushed or damaged when the fitting is received by the receiving portion. Thus, in some embodiments, the method of assembling the capillary assembly of the present invention comprises, before deforming the deformable portion: inserting a dummy part into the receiving portion so that the dummy part abuts the connecting face and extends across the connecting passage; and displacing the inner capillary tubing relative to the compliant material sleeve so that the inner capillary tubing is inserted into the connecting passage.

When a dummy part is used to assist with locating the end portion of the inner capillary tubing within the connecting passage, the dummy part will be removed to permit the fitting to be received in the receiving portion. The dummy part may be removed before the deformable portion is deformed or after. Often the dummy part will be removed after the deformable portion has been deformed so as to ensure that the inner capillary tubing is not caused to extend into the receiving portion during the deforming process.

The dummy part can be plastic screw fitting configured to occupy the void space within the receiving portion. That is, the shape and size of the dummy part may correspond to the external dimensions of the fitting. In general, the dummy part provides a flat surface to abut against the connecting face of the receiving portion and covers the end of the connecting passage. In some embodiments, the dummy part may be a fitting of the type that the receiving portion is intended to receive. The fitting used as the dummy part may be modified to block or otherwise fill the part of the fitting that would be occupied by the fluid conduit.

In some embodiments, the method of assembling a capillary assembly may comprise:
inserting a fitting into the receiving portion so that the fitting is received; and
displacing the inner capillary tubing relative to the compliant material sleeve so that the end portion of the inner capillary tubing is inserted into the connecting passage until the inner capillary tubing contacts the fitting.

If the end portion of the inner capillary tubing is inserted into an intermediate position along the connecting passage, the method of assembling a capillary assembly may still comprise inserting the fitting into the receiving portion before positioning the inner capillary tubing along the connecting passage so as to prevent the end portion of the inner capillary tubing being inserted too far through the connecting passage. As noted above, it is undesirable for the inner capillary tubing to be inserted so far through the connecting passage that part of the end portion extends past the connecting face of the receiving portion, as this part of the inner capillary tubing may be crushed or damaged when the fitting is received by the receiving portion.

In the second aspect of the present invention, the method of assembling a capillary assembly may comprise:
inserting the compliant material sleeve into the capillary holder;
inserting an end of the capillary into the capillary holder so that the inner capillary tubing is located within the compliant material sleeve; and
deforming the deformable portion so that the compliant material is deformed to create a seal between the inner capillary tubing and the connector. Deforming the deformable portion may comprise crimping the crimpable portion so that the compliant material is deformed to create a seal between the inner capillary tubing and the connector. The crimping may be performed as described above.

The capillary and the compliant material sleeve may be inserted into the capillary holder simultaneously. For example, before either component is inserted, the inner capillary tubing can be put into the compliant material sleeve so that both components can be inserted into the capillary holder at the same time.

A dummy part may be inserted into the receiving portion so that the compliant material sleeve and/or inner capillary tubing can be suitably positioned along the capillary holder before the deformable portion is deformed. For example, the compliant material sleeve and/or inner capillary tubing may be inserted into the capillary holder until is abuts the dummy part.

In embodiments where the capillary holder comprises a sleeve section, the method may comprise inserting the compliant material sleeve along a first direction so that it is located in the sleeve section; wherein the end of the capillary is inserted into the capillary holder along a second direction that is opposite to the first direction. Thus, in the second aspect of the invention, during assembly of the capillary assembly the capillary may be inserted into the capillary holder so that a secondary compliant material sleeve contacts at least the end face of the (primary) compliant material sleeve. For example, capillary may be inserted into the capillary holder so that the face at the end of the secondary compliant material sleeve may contact the end face of the compliant material sleeve.

Before deforming the deformable portion, the method may comprise:
inserting the capillary into the capillary holder so that the inner capillary tubing is inserted in an end of the compliant material sleeve distal to the receiving portion and emerges out the end proximal to the receiving portion; and
displacing the inner capillary tubing relative to the compliant material sleeve so the end of the inner capillary tubing is aligned with the end proximal to the receiving portion or located within the compliant material sleeve at a position near the end proximal to the receiving portion. A position that is suitably near the end proximal to the receiving portion is one where the fluid connection of the fluid conduit and the inner capillary tubing will not be unacceptably compromised by the deformation of the compliant material sleeve when the deformable portion is deformed to create the seal.

In some embodiments, a dummy part may be used to position the inner capillary tubing so that it is aligned with the end proximal to the receiving portion or located within the compliant material sleeve at a position near the end proximal to the receiving portion. The method may comprise inserting a dummy part into the receiving portion so that the dummy part displaces the inner capillary tubing until the dummy part abuts the compliant material sleeve.

When a dummy part is used to assist with locating the end portion of the inner capillary tubing within the compliant material sleeve, the dummy part will be removed to permit the fitting to be received in the receiving portion. The dummy part may be removed before the deformable portion is deformed or after. Often the dummy part will be removed after the deformable portion has been deformed so as to ensure that the inner capillary tubing is not caused to extend into the receiving portion during the deforming process. In addition, as the compliant material sleeve of certain embodiments defines the connecting face at the end of the receiving portion, it can be desirable to keep the dummy part in place during deforming of the deformable portion so that the end, such as the sealing recess, of receiving portion is not deformed and is still of the desired shape for receiving the fitting.

As described above, the dummy part can be plastic screw fitting configured to occupy the void space within the receiving portion. That is, the shape and size of the dummy part may correspond to the external dimensions of the fitting. In general, the dummy part provides a flat surface to abut against the compliant connecting face of the sleeve and covers the end of the passage through the sleeve. In some embodiments, the dummy part may be a fitting of the type that the receiving portion is intended to receive. The fitting used as the dummy part may be modified to block or otherwise fill the part of the fitting that would be occupied by the fluid conduit.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Embodiments have been described herein with reference to the accompanying drawings. However, some modifications to the described embodiments may be made without departing from the spirit and scope of the described embodiments, as described in the appended claims.

The invention claimed is:

1. A connector for providing a fluid connection between a capillary and a fluid conduit, said connector comprising:
   a capillary holder for receiving an end of the capillary, said capillary comprising inner capillary tubing, wherein the inner capillary tubing of the received end of the capillary is located within a compliant material sleeve;
   a crimpable portion through which the end of the capillary is passed to be received by the capillary holder, the crimpable portion being configured for crimping onto the compliant material sleeve so that the compliant material of the sleeve within the crimpable portion is deformed to create a seal between the inner capillary tubing and the connector; and
   a receiving portion configured to receive a fitting at an end of the fluid conduit;
   wherein the capillary holder and the receiving portion are connected so that the connector is configured to fluidly connect the capillary and the fluid conduit.

2. A connector according to claim 1, wherein:
   the capillary holder is a capillary recess for receiving the end of the capillary, said capillary comprising inner capillary tubing within the compliant material sleeve; and
   a connecting passage connects the capillary recess and the receiving portion and is configured to fluidly connect the capillary and the fluid conduit.

3. A connector according to claim 2, wherein the connecting passage is configured to receive the inner capillary tubing.

4. A connector according to claim 2, wherein the connecting passage has a bore narrower than the inner capillary tubing.

5. A connector according to claim 1, wherein the capillary holder is configured to receive the compliant material sleeve so that when the capillary holder receives the end of the capillary, the inner capillary tubing is also received by the compliant material sleeve.

6. A connector according to claim 5, wherein the capillary holder comprises a sleeve section configured for receiving and locating the compliant material sleeve.

7. A capillary assembly comprising:
   a connector according to claim 1; and
   a capillary comprising an inner capillary tubing;
   wherein: an end of the capillary is received in the capillary holder and located within a compliant material sleeve.

8. A capillary assembly according to claim 7, wherein:
   the capillary comprises the inner capillary tubing within the compliant material sleeve;
   the capillary holder is a capillary recess for receiving an end of the capillary, said capillary comprising inner capillary tubing within the compliant material sleeve;
   a connecting passage connects the capillary recess and the receiving portion and is configured to fluidly connect the capillary and the fluid conduit; and
   an end of the capillary is received in the capillary.

9. A capillary assembly according to claim 8, wherein:
   the connecting passage is configured to receive the inner capillary tubing; and
   an end portion of the inner capillary tubing is received in the connecting passage.

10. A capillary assembly according to claim 9, wherein:
    the connecting passage extends between an end face of the capillary recess and a connecting face of the receiving portion; and
    the inner capillary tubing received in the connecting passage extends therethrough until the connecting face.

11. A capillary assembly according to claim 7, wherein the capillary forms part of a chromatography column.

12. A connector according to claim 2, wherein the connecting passage has a bore narrower than the inner capillary tubing.

13. A connector according to claim 5, wherein the capillary holder comprises a sleeve section configured for receiving and locating the compliant material sleeve.

14. A capillary assembly according to claim 8, wherein:
    the connecting passage is configured to receive the inner capillary tubing; and
    an end portion of the inner capillary tubing is received in the connecting passage.

15. A capillary assembly according to claim 14, wherein:
    the connecting passage extends between an end face of the capillary recess and a connecting face of the receiving portion; and
    the inner capillary tubing received in the connecting passage extends therethrough until the connecting face.

16. The connector according to claim 1, wherein the crimpable portion is configured to be crimped radially onto the compliant material sleeve.

17. The connector according to claim 1, wherein an internal diameter of the capillary holder is less than an internal diameter of the receiving portion.

18. The connector according to claim 17, wherein:
    the capillary holder defines a capillary recess for receiving the end of the capillary;
    the connector comprises an end face at which the capillary recess terminates; and
    the connector comprises a connecting passage with an opening defined at the end face, and the connecting passage connects the capillary recess and the receiving portion.

* * * * *